(12) United States Patent
Abu Qahouq

(10) Patent No.: US 11,233,397 B2
(45) Date of Patent: Jan. 25, 2022

(54) SYSTEMS, METHODS, AND DEVICES FOR SIMULTANEOUS CONVERSION AND INVERSION OF ELECTRICAL POWER

(71) Applicant: The Board of Trustees of The University of Alabama, Tuscaloosa, AL (US)

(72) Inventor: Jaber A. Abu Qahouq, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 549 days.

(21) Appl. No.: 15/981,434

(22) Filed: May 16, 2018

(65) Prior Publication Data

US 2018/0337532 A1 Nov. 22, 2018

Related U.S. Application Data

(60) Provisional application No. 62/506,911, filed on May 16, 2017.

(51) Int. Cl.
*H02J 3/06* (2006.01)
*B60R 16/03* (2006.01)
(Continued)

(52) U.S. Cl.
CPC ............... *H02J 3/06* (2013.01); *B60R 16/03* (2013.01); *H02J 1/00* (2013.01); *H02M 3/155* (2013.01);
(Continued)

(58) Field of Classification Search
CPC ...... H02J 3/06; H02J 1/00; H02J 3/383; H02J 3/381; H02J 2300/24; H02J 2310/46;
(Continued)

(56) References Cited

U.S. PATENT DOCUMENTS 3,368,141 A * 2/1968 Subieta-Garron .... H01F 29/146
323/330
4,550,364 A * 10/1985 Shaw ...................... H01F 19/08
336/212
(Continued)

OTHER PUBLICATIONS

Fang, "Isolated Bias Power Supply for IGBT Gate Drives Using the Fly-Buck Converter,"2015 IEEE Applied Power Electronics Conference and Exposition (APEC), pp. 2373-2379, (Year: 2015).*
(Continued)

*Primary Examiner* — Pinping Sun
(74) *Attorney, Agent, or Firm* — Meunier Carlin & Curfman LLC

(57) ABSTRACT

An example device for simultaneous transfer of alternating current (AC) and directed current (DC) power includes a power converter or inverter circuit having a switch, a power magnetic device comprising a coupled winding, a DC power output loop for delivering DC power to a DC load, and an AC power output loop for delivering AC power to an AC load. The DC power can be a function of a direct current (DC) component of a current of the power inductor, and the AC power can be a function of an induced and/or switching alternating current (AC) ripple component of the current of the power inductor. In addition, the device can include a controller operably coupled to the power converter or inverter circuit. The controller can include a processing unit and a memory and can be configured to independently regulate the DC power and the AC power.

17 Claims, 14 Drawing Sheets

(51) Int. Cl.
  *H02M 3/155* (2006.01)
  *H02J 1/00* (2006.01)
  *H02M 3/337* (2006.01)
  *H02M 3/158* (2006.01)
  *H02J 3/38* (2006.01)
  *H02M 1/00* (2006.01)

(52) U.S. Cl.
  CPC ......... *H02M 3/1582* (2013.01); *H02M 3/337* (2013.01); *H02J 3/383* (2013.01); *H02M 1/007* (2021.05); *H02M 1/008* (2021.05); *H02M 3/1586* (2021.05)

(58) Field of Classification Search
  CPC .. H02J 2310/48; H02M 3/337; H02M 3/1582; H02M 3/155; H02M 2001/007; H02M 2001/008; H02M 2003/1586; B60R 16/03; Y02E 10/56
  See application file for complete search history.

(56) References Cited

U.S. PATENT DOCUMENTS

| | | | | |
|---|---|---|---|---|
| 6,058,026 | A * | 5/2000 | Rozman | H02M 3/33561 363/16 |
| 9,660,538 | B2 * | 5/2017 | Wu | H02M 3/33561 |
| 9,755,532 | B2 * | 9/2017 | Karlsson | H02M 3/335 |
| 9,906,067 | B1 * | 2/2018 | Garrity | H02J 7/025 |
| 10,531,256 | B2 * | 1/2020 | Nguyen | B66B 7/00 |
| 2007/0109708 | A1 * | 5/2007 | Hussman | H02J 50/40 361/113 |
| 2007/0222426 | A1 * | 9/2007 | Waffenschmidt | H02J 50/80 323/355 |
| 2009/0079404 | A1 * | 3/2009 | Pigott | H02M 3/1584 323/271 |
| 2010/0264730 | A1 * | 10/2010 | Tran | H02K 99/00 307/17 |
| 2011/0095611 | A1 * | 4/2011 | Yeh | H02J 9/062 307/66 |
| 2013/0127257 | A1 * | 5/2013 | Yamamoto | H02J 4/00 307/104 |
| 2014/0225433 | A1 * | 8/2014 | Niizuma | B60L 53/22 307/10.1 |
| 2014/0232197 | A1 * | 8/2014 | Keeling | H02J 50/60 307/83 |
| 2015/0207400 | A1 * | 7/2015 | Shenoy | H02M 3/1584 323/213 |
| 2016/0322915 | A1 * | 11/2016 | Bazzi | H02M 7/537 |
| 2017/0117085 | A1 * | 4/2017 | Mao | H01F 41/02 |
| 2017/0324343 | A1 * | 11/2017 | Ishigaki | H01F 27/325 |

OTHER PUBLICATIONS

Abu Qahouq, "Investigation and Simulation Model Results of Harvesting and Transfer Method," 2017 IEEE Applied Power Electronics Conference and Exposition (APEC), pp. 3095-3099, Mar. 2017 (Year: 2017).*

Tacca, "Single-Switch Two-Output Flyback-Forward Converter Operation," IEEE Transactions on Power Electronics, vol. 13, No. 5, Sep. 1998, pp. 903-911 (Year: 1998).*

Y. Li and Y. H. Han. "A module-integrated distributed distributed battery energy storage and management system", IEEE Trans. Power Electron., vol. 31, No. 12, pp. 8260-8270, Dec. 2016.

C-S. Wang, O. H. Stielau and G. A. Covic, "Design considerations for a contactless electric vehicle battery charger," IEEE Trans. Ind. Electron, vol. 52, No. 5, pp. 1308-1314, Oct. 2005.

M.Y. Kim, C. H. Kim, J. H. Kim and G. W. Moon, "A chain structure of switched capacitor for improved cell balancing speed of lithium-ion batteries", IEEE Trans. Ind. Electron., vol. 61, No. 8, pp. 3989-3999, Aug. 2014.

S. J. Liu, J. C. Jiang, W. Shi, Z. Y. Ma, L. Y. Wang and H. Y Guo, "Butler-volmer-equation-based electrical model for high-power lithium titanate batteries used in electric vehicles," IEEE Trans. Ind. Electron., vol. 62, No. 12, pp. 7557-7568, Dec. 2015.

O. C. Onar, J. M. Miller, S. L. Campbell, C. Coomer, C. P. White, and Seiber, L. E, "Oak Ridge National Laboratory wireless power transfer development for sustainable campus initiative," In Transportation Electrification Conference and Expo (ITEC), pp. 1-8, Jun. 2013.

P. Patra, J. Ghosh, and A. Patra, "Control scheme for reduced cross regulation in single-inductor multiple-output DC-DC converters," IEEE Trans. Ind. Electron., vol. 60, No. 11, pp. 5095-5104, Nov. 2013.

X. Jing, P. K. T. Mok, M. C. Lee, "A wide-load-range constant-charge-auto-hopping control single-inductor-dual-output boost regulator with minimized cross-regulation", IEEE J. Solid-State Circuits, vol. 46, No. 10, pp. 2350-2362, Oct. 2011.

K. Chalermyanont, P. Sangampai, A. Prasertsit and S. Theinmontri, "High Frequency Transformer Designs for Improving Cross Regulation in Multiple-Output Flyback Converters," 7th International Conference on Power Electronics and Drive Systems, Nov. 2007.

W. Wang, D. X. Lu, Q. Q. Chai, Q. B. Lin and F. H. Cao "Analysis of fly-buck converter with emphasis on its cross-regulation," IET Power Electron., vol. 10, No. 3, pp. 292-301, Sep. 2017.

S. W. Choi, J. M. Lee, and J. Y. Lee, "High-Efficiency Portable Welding Machine Based on Full-Bridge Converter With ISOP-Connected Single Transformer and Active Snubber," IEEE Trans. Ind. Electron., vol. 63, No. 8, pp. 4868-4877, Aug. 2016.

Y. Cui, F. Yang, L. M. Tolbert, D. J. Costinett, F. Wang and B. J. Blalock, "Load-Dependent Soft-Switching Method of Half-Bridge Current Doubler for High-Voltage Point-of-Load Converter in Data Center Power Supplies," IEEE Trans. Power Electron., vol. 32, No. 4, pp. 2976-2985, Apr. 2018.

H. Y. Li, L. Zhao, C. Y Xu and X. M. Zheng, "A Dual Half-Bridge Phase-Shifted Converter with Wide ZVZCS Switching Range," IEEE Trans. Power Electron., vol. 20, No. 6, pp. 2976-2985, Jun. 2017.

S. Dutta, S. Hazra, and S. Bhattacharya, "A Digital Predictive Current-Mode Controller for a Single-Phase High-Frequency Transformer-Isolated Dual-Active Bridge DC-to-DC Converter," IEEE Trans. Ind. Electron., vol. 33, No. 4, pp. 5943-5952, Sep. 2016.

I. Endo, H. Tatsumi, I. Otsuka, H. Yamamoto, A. Shintani, H. Koshimoto, M. Yagi and K. Murata, "Magnetic Properties of Compressed Amorphous Powder Cores and Their Application to a Fly-Back Converter," IEEE Trans. Magnet., vol. 36, No. 5, pp. 3421-3423, Sep. 2000.

J. T. Su, C. W. Lin, "Auto-tuning scheme for improved current sharing of multiphase DC-DC converters", IET Power Electron., vol. 5, No. 9, 2012, 1605-1613.

J. Abu Qahouq and Z. Dang, "Investigation and simulation model results of high density wireless power harvesting and transfer method," 2017 IEEE Applied Power Electronics Conference and Exposition (APEC 2017), pp. 3095-3099, Mar. 2017.

D. Ahn and S. Hong, "Effect of coupling between multiple transmitters or multiple receivers on wireless power transfer," IEEE Trans. Industrial Electron., vol. 60, No. 7, pp. 2602-2613, Jul. 2013.

J. J. Casanova, Z. N. Low, J. Lin, "A loosely coupled planar wireless power system for multiple receivers", IEEE Trans. Ind. Electron., vol. 56, No. 8, pp. 3060-3068, Aug. 2009.

B.C. Teck, K. Masaki, I. Takehiro, O. Sehoon and H. Yoichi, "Automated Impedance Matching System for Robust Wireless Power Transfer via Magnetic Resonance Coupling," IEEE Trans. Ind. Electron., vol. 60, No. 9, 10 pages, Sep. 2013.

M. Fu, C. Ma, and X. Zhu, "A Cascaded Boost-Buck Converter for High Efficiency Wireless Power Transfer System," IEEE Trans. Ind. Informat., vol. 10, No. 3, pp. 1972-1980, Aug. 2014.

L. H. Chen, S. Liu, Y.C. Zhou and T.J. Cui, "An Optimizable Circuit Structure for High-Efficiency Wireless Power Transfer," IEEE Trans. Ind. Electron., vol. 60, No. 1, pp. 339-349, Jan. 2013.

Y. H. Sohn, B. h. Choi and E.S. Lee, G. C. Lim, G. Cho, C. T. Rim. "General Unified Analyses of Two-Capacitor Inductive Power Trans-

(56) References Cited

OTHER PUBLICATIONS fer Systems: Equivalence of Curret-Source SS and SP Compensations", IEEE Trans. Power Elecron., vol. 30, No. 11, pp. 6030-6045, Nov. 2015.

C. Zheng, H. B. Ma, J. S, Lai and L. H. Zhang. "Design Considerations to Reduce Gap Variation and Misalignment Effects for the Inductive Power Transfer System", IEEE Trans. Power Electron., vol. 30, No. 11, pp. 6108-6119, Nov. 2015.

Y. W, Y. Yao, X. Liu, D. Xu and L. Cai. "An LC/S Compensation Topology and Coil Design Technique for Wireless Power Transfer", IEEE Trans. Power Electron., vol. 33, No. 3, pp. 2007-2025, Apr. 2017.

TDK Corporation, Datasheet of part No. WT-505060-8K2-LT wireless charging coil, last accessed on Sep. 1, 2017.

TDK Corporation, Datasheet of part No. WT505090-20K2-A10-G wireless charging coil, last accessed on Sep. 1, 2017.

Tenergy Corp., Fremont, CA Tenergy cylindric Lithium-ion cell 30005-0 datasheet, Tenergy Corp., Fremont, CA.

J. Abu Qahouq, O. Rahman, L. Huang and I. Batarseh, "On Load Adaptive Control of Voltage Regulators for Power Managed Loads: Control Schemes to Improve Converter Efficiency and Performance", IEEE Trans. Power Electron., vol. 22, No. 5, pp. 1806-1819, Sep. 2007.

Minfan Fu; He Yin; Ming Liu; Chengbin Ma, "Loading and Power Control Class E PA-Driven Megahertz WPT System," IEEE Trans. Ind. Electron., vol. 63, No. 11, pp. 6867-6876, Jun. 2016.

R. W. Erickson and D. Macsimović, "Chapter 13: Transformer Modeling," Fundamentals of power electronics, Second Edition, Kluwer Academic Publishers, 2001.

L. Peng, O. Breinbjerg and N. A. Mortensen, "Wireless Energy Transfer Through Non-Resonant Magnetic Coupling", Journal of Electromagnetic Waves and Applications, vol. 24, No. 11, pp. 1587-1598, 2010.

* cited by examiner

SYSTEMS, METHODS, AND DEVICES FOR SIMULTANEOUS CONVERSION AND INVERSION OF ELECTRICAL POWER

CROSS REFERENCE TO RELATED APPLICATIONS

This application claims priority to and benefit of U.S. provisional patent application No. 62/506,911 filed May 16, 2017, which is fully incorporated by reference and made a part hereof.

BACKGROUND

In Electric and Hybrid-Electric Vehicle application (EV and HEV) and in Photovoltaic (PV) solar renewable energy system applications, considered as example applications herein, two types of loads exist: DC loads and AC loads. Nowadays, separate power converter and inverter systems are used to supply power to the DC loads and AC loads from the energy source, such as a battery in EVs or PV panels in PV solar systems. If the same set of switches, switch drivers, inductor(s), capacitor(s), and other associated circuits can be used to deliver DC and AC power simultaneously, this would lead to significant reduction in cost and size/volume, increased reliability, simplified maintenance and installation, and ease of integration.

FIG. 1 shows a general simplified example block diagram of an Electric Drive Traction System (ETDS) for an Electric Vehicle (EV). It shows the power electronic path which powers an AC motor from the battery through a two-stage or single-stage DC-AC inverter, which constitutes a large part of the ETDS. It also shows the DC-DC power converter which powers the ever-increasing auxiliary loads from the battery. The power level required from this converter continues to increase and it is becoming a significant part of the EV especially in terms of cost and size. In some proposed EV designs, there could be more than one motor, each powering a wheel or more, which might require more than one converter-inverter systems to be able to control several wheels individually.

FIG. 2 shows a general simplified example block diagram of a PV solar system with energy storage. One or more DC-DC power converters are used to charge the battery and/or to perform Maximum Power Point Tracking (MPPT) control. A DC-AC inverter is used to generate AC power to supply AC loads and/or the grid. The converter and inverter could be separate modules from the PV panels or could be integrated with each PV panel to form to what is commonly referred to as "micro inverter."

In both example systems of FIG. 1 and FIG. 2, there is a need to reduce the cost and size/weight while simplifying installation and maintenance and maintaining high efficiency and reliability. This is in order to increase the rate of the adoption of EVs/HEVs and Renewable Energy Systems, among other benefits. New power electronic circuits and control method can support this target, which is the main focus of the proposed concepts. The use of this current AC ripple component has not been explored and is also considered a disadvantage. As described above, state-of-the-art circuits and controllers used for AC power transmission are different from the state-of-the-art circuits and controllers used for DC power transmission.

Therefore, systems, methods and devices are desired that overcome challenges in the art, some of which are described above.

SUMMARY

Systems, devices, and methods are described herein that facilitate using a power converter circuit or power inverter circuit to transfer and regulate power both AC and DC at the same time (i.e., simultaneously) using the same circuit, which also reduces size and cost and improves efficiency. It is possible to use the same power converter or inverter circuit (e.g., the circuit used for conventional DC power transmission and regulation described above) to deliver both AC power and DC power because current flowing through a first winding of a power magnetic device having inductively coupled windings includes a direct current (DC) component and an alternating current (AC) ripple component. This AC ripple component can be an induced ripple as described herein, or the natural switching ripple of the converter or inverter circuit as described herein, or both the induced and natural switching ripple as described herein. The DC component is used to deliver power to the DC output, and the AC ripple component is used to deliver power to the AC output. It should be understood that the AC ripple component generates a magnetic field, which is transformed into AC power by a second winding of the magnetic power device. The systems, devices, and methods described herein use control techniques that allow for voltage, current, and/or power regulation to each of the AC and DC outputs separately. Therefore, there is no need for two separate controllers for separate circuits.

An example device for simultaneous transfer of AC and DC power is described herein. The device can include a power converter or inverter circuit having a switch, a magnetic device comprised of at least two inductively coupled windings, wherein a first winding acts as a power inductor and carries both an AC current and power component and a DC current and power component and a second winding that carries AC current and power that is transformed from the first winding, a DC power output loop for delivering DC power to a DC load, and an AC power output loop for delivering AC power to an AC load. The DC power can be a function of the direct current (DC) component of the current of the first winding of the power magnetic device, and the AC power can be a function of an alternating current (AC) component of the current of the first winding of the power magnetic device. In addition, the device can include a controller operably coupled to the power converter or inverter circuit. The controller can include a processing unit and a memory and can be configured to independently regulate the DC power and the AC power.

Additionally, the controller can use a respective closed control loop for regulating each of the DC power and the AC power.

Alternatively or additionally, the controller can be configured to independently regulate the DC power and the AC power by altering at least one of a signal that controls a duty cycle or a switching frequency of the switch.

In some implementations, the controller can be configured to regulate the AC power by perturbing a signal that controls the duty cycle of the switch. This perturbation can cause a change in the AC component of the current of the first winding of the power magnetic device, which causes varying magnetic field for AC power transmission. This is sometimes referred to herein as induced AC ripple component. For example, to perturb the signal that controls the duty cycle of the switch, the controller can introduce a time-varying perturbation to the signal. The time-varying perturbation can be a sinusoidal or non-sinusoidal waveform. Additionally, the controller can be configured to regulate the AC power by adjusting a peak-to-peak value or frequency of the time-varying perturbation.

In some implementations, the controller can be configured to regulate the AC power by adjusting a frequency of a signal that controls the switching frequency of the switch. This adjustment can cause a change in the AC component of the current of the first winding of the power magnetic device, which causes varying magnetic field for AC power transmission. This is sometimes referred to herein as natural switching AC ripple component.

Alternatively or additionally, the controller can be configured to regulate the DC power by adjusting a signal that controls the duty cycle of the switch.

Alternatively or additionally, the power converter or inverter circuit can include pulse width modulation (PWM) generator operably coupled to the controller. The PWM generator can be configured to transmit control signals to the switch of the power converter or inverter circuit.

Alternatively or additionally, the power magnetic device can comprise a variable inductor. In addition, the controller can be configured to regulate the AC power by adjusting an inductance value of the variable inductor. This adjustment can cause a change in the AC component of the current of the power magnetic device, which causes varying magnetic field for AC power transmission.

Alternatively or additionally, the device can further include a plurality of power converter or inverter circuits, where respective DC power output loops or respective AC power output loops of the power converter or inverter circuits are connected in series or parallel.

Alternatively or additionally, the power converter or inverter circuit can include a plurality of power magnetic devices and a plurality of AC power output loops, where each AC power output loop can be configured to deliver AC power to an AC load. According to this implementation, AC power delivered to each AC load can be a function of the AC component of the current of a respective power magnetic device.

Alternatively or optionally, the device comprises an electric vehicle (EV) converter circuit.

Alternatively or optionally, the device is used to provide polyphase AC power such as, for example, three-phase AC power.

Alternatively or additionally, a winding of the power magnetic device can be at least one of copper, gold, graphene, carbon nanotubes, a superconductor material, a piezoelectric material, or an RF element.

Alternatively or additionally, the power magnetic device can include a magnetic sheet or core.

Alternatively or optionally, the power magnetic device can include a permanent magnet placed within its core or gap.

Alternatively or additionally, the device can include a power source. Alternatively or additionally, the controller can be further configured to control a bidirectional flow of the DC power or the AC power between the power source and the DC power output loop or the AC power output loop. Alternatively or additionally, the controller can be configured to control the bidirectional flow of the DC power or the AC power to maximize efficiency of the device. Alternatively or additionally, the controller can be configured to control the bidirectional flow of the DC power or the AC power to perform maximum power point tracking.

An example method for simultaneous transfer of AC and DC power is also described herein. The method can include regulating DC power delivered to a DC load via a DC power output loop of a power converter or inverter circuit, and regulating AC power delivered to an AC load via an AC power output loop of the power converter or inverter circuit. The DC power can be a function of a direct current (DC) component of a current of the power magnetic device, and the AC power can be a function of an alternating current (AC) component of the current of the power magnetic device. Additionally, the DC power and the AC power can be regulated independently of one another.

Additionally, the DC power and the AC power can be regulated independently of one another by altering at least one of a signal that controls a duty cycle or a switching frequency of a switch of the power converter or inverter circuit.

In some implementation, the method can include perturbing a signal that controls the duty cycle of the switch. This perturbation can cause a change in the AC component of the current of the power magnetic device, which causes varying magnetic field for AC power transmission. This is sometimes referred to herein as induced AC ripple component. For example, to perturb the signal that controls the duty cycle of the switch, the method can include introducing a time-varying perturbation to the signal. The time-varying perturbation can be a sinusoidal or non-sinusoidal waveform. Additionally, the method can include adjusting a peak-to-peak value or frequency of the time-varying perturbation.

Alternatively or additionally, the method can include regulating AC power delivered to an AC load via a plurality of AC power output loops of respective power converter or inverter circuits, where the respective perturbations of signals that control the respective duty cycles of the switches of the power converter or inverter circuits are phase shifted relative to each other.

In some implementation, the method can include adjusting a frequency of a signal that controls the switching frequency of the switch. This adjustment causes a change in the AC component of the current of the power magnetic device, which causes varying magnetic field for AC power transmission. This is sometimes referred to herein as natural switching AC ripple component.

In some implementations, the method can include adjusting an inductance value of the power magnetic device. This adjustment causes a change in the AC component of the current of the power magnetic device, which causes varying magnetic field for AC power transmission.

Alternatively or additionally, the power converter or inverter circuit can include a plurality of power magnetic devices and a plurality of AC power output loops, where each AC power output loop can be configured to deliver AC power to an AC load. According to this implementation, AC power delivered to each AC load can be a function of an AC component of the current of a respective power magnetic device.

Alternatively or additionally, the method can further include converting the AC power to at least one of radiofrequency (RF) energy, sound, or light, and transmitting the at least one of RF energy, sound, or light.

An example system for simultaneous transfer of AC and DC power is also described herein. The system can include an AC powered device and a power transfer device that is inductively coupled with the AC power receiving device. The power transfer device can include a power converter or inverter circuit having a switch, a power magnetic device, a DC power output loop for delivering DC power to a DC load, and an AC power output loop for delivering AC power to the AC powered device. The DC power can be a function of a direct current (DC) component of a current of a first winding of the power magnetic device, and the AC power can be a function of an alternating current (AC) component of the current of the first winding of the power magnetic device.

Additionally, the power transfer device can include a controller operably coupled to the power converter or inverter circuit. The controller can include a processing unit and a memory and can be configured to independently regulate the DC power and the AC power.

Another example system for simultaneous transfer of AC and DC power is described herein. The system can include a first device and a second device, where the first and second devices are configured as any of the power transfer devices described herein. The system can also include an AC power link, where the first device and the second device are inductively coupled through the AC power link. The respective AC power delivered to each AC load can be a function of the AC component of the respective current of the respective power magnetic device of each of the first device and the second device.

Additionally, each of the first device and the second device can include an active bridge circuit operably coupled to the respective power converter or inverter circuit. As described herein, the direction of the power flow can be a function of which active bridge circuit is ON or OFF.

Alternatively or additionally, one or more switches of the respective active bridge circuit of the first device or the second device can be impeded to control a bidirectional flow of AC power between the first device and the second device through the AC power link.

Alternatively or additionally, at least one of the first device or the second devices can include a power source.

Alternatively or additionally, the AC power can be delivered through the respective AC power output loops of the respective power converter or inverter circuits of the first and second devices regardless of the bidirectional flow of the AC power between the first device and the second device.

Further disclosed and described herein is a magnetic power device. One embodiment of the magnetic poser device comprises a first winding; at least one second winding inductively coupled with the first winding; and an energy source connected to the first winding, wherein the first winding acts as a power inductor and carries both an AC current and power component and a DC current and power component provided by the energy source and the at least one second winding carries AC current and power that is transformed from the first winding.

Alternatively or optionally, the magnetic power device may further comprise a controller operably coupled to the power magnetic device, wherein the controller comprises a processing unit and a memory operably coupled to the processing unit, the memory having computer-executable instructions stored thereon that, when executed the processing unit, cause the controller to independently regulate the AC current and power component and the DC current and power component provided by the energy source.

In one exemplary embodiment, the magnetic power device may comprise a portion of an inverter or converter device. The controller can be used to adjust a peak-to-peak value of an AC reference signal to control AC voltage, AC current, AC power, photovoltaic maximum power point tracking, battery charging, and/or battery discharging of the inverter or converter device. Alternatively or optionally, the controller can be used to adjust a DC reference value to control DC voltage, DC current, DC power, photovoltaic maximum power point tracking, battery charging, and/or battery discharging of the inverter or converter device.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. As used herein, "exemplary" means an example of and is not intended to denote a preference or a preferred embodiment. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for power electronic conversion and inversion for next generation renewable energy systems and electrified transportation, it will become evident to those skilled in the art that the implementations are not limited thereto.

Systems, devices, and methods are described herein that facilitate using a power electronic circuit for simultaneous conversion and inversion of electrical power and regulate both at the same time (i.e., simultaneously) using the same circuit, which also reduces size and cost. It is possible to use the same power converter or inverter circuit to deliver converted or inverted power because current flowing through a winding (e.g. first winding) of a power magnetic device includes a direct current (DC) component and an alternating current (AC) ripple component. This AC ripple component can be an induced ripple as described herein, or can be the natural switching ripple of the converter or inverter circuit described herein, or can be both the induced and natural switching ripple as described herein.

Figure 3A:
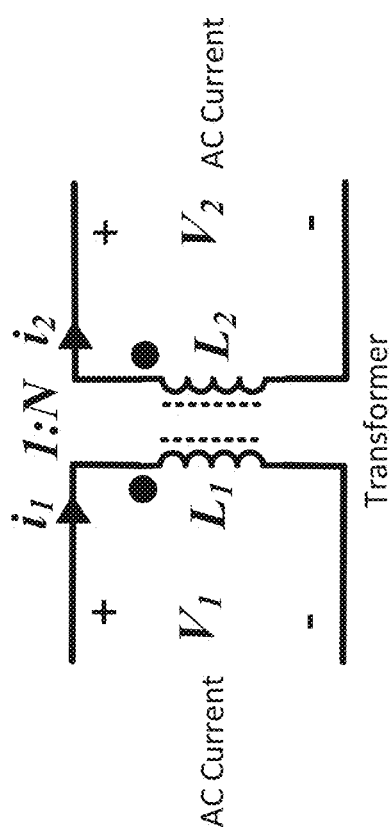
FIGS. 3A, 3B and 3C illustrate different power magnetic device configurations: (A) power transformer, (B) inversely coupled power inductor, and (C) a power magnetic device configuration of interest for embodiments of this invention as described herein.
Figure 3C:
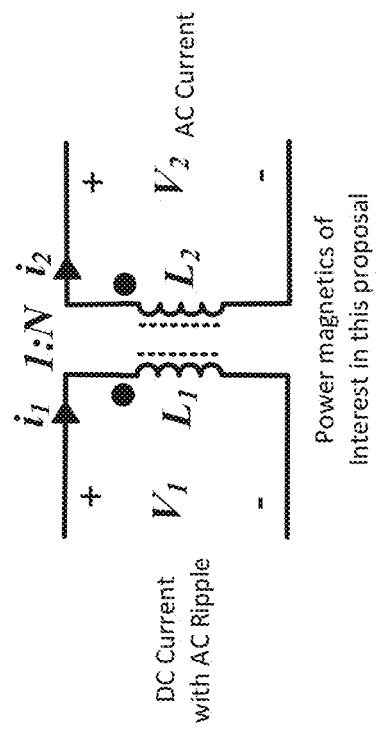
Figure 3B:
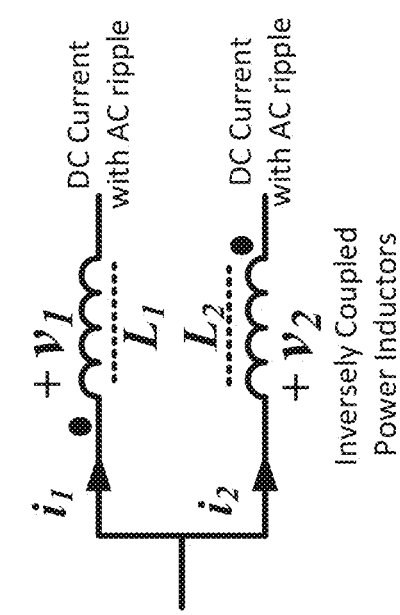
Figure 4A:
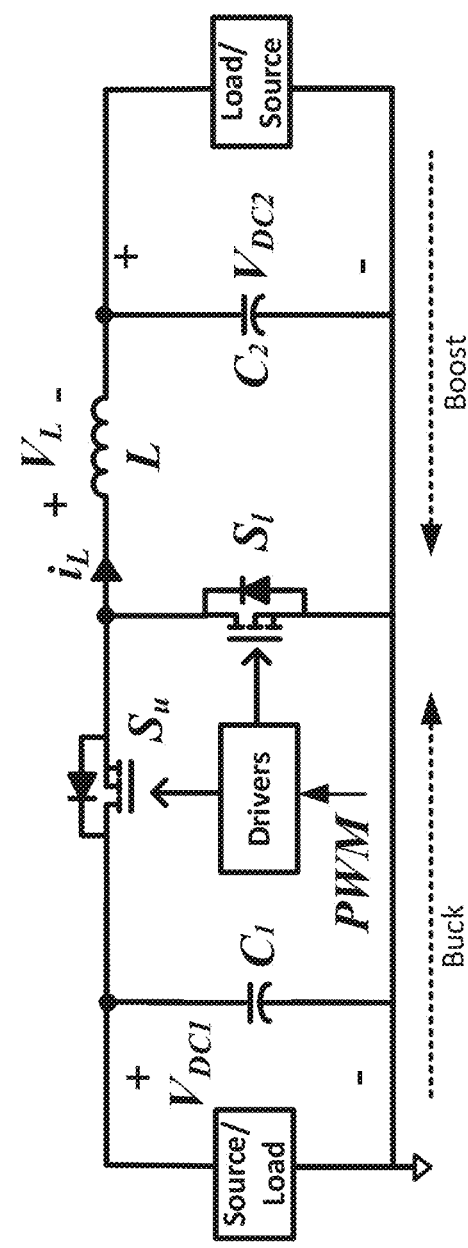
FIGS. 4A, 4B and 4C illustrate exemplary DC-DC power converters: (A) buck/boost power converter, (B) two-phase boost power converter with coupled inductors, and (C) isolated half-bridge with current-doubler power converter.
Figure 4B:
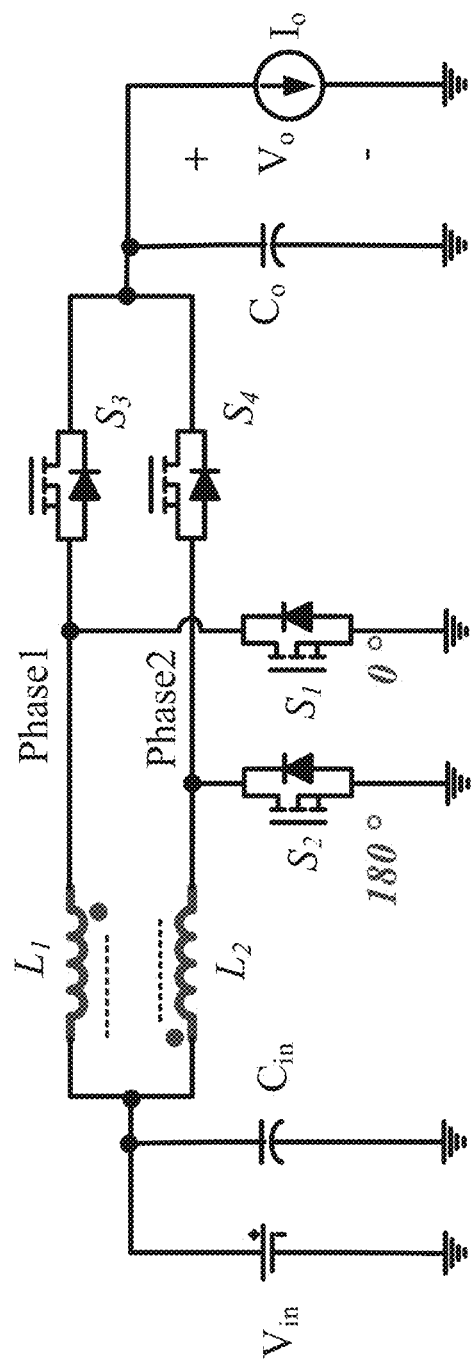
Figure 4C:
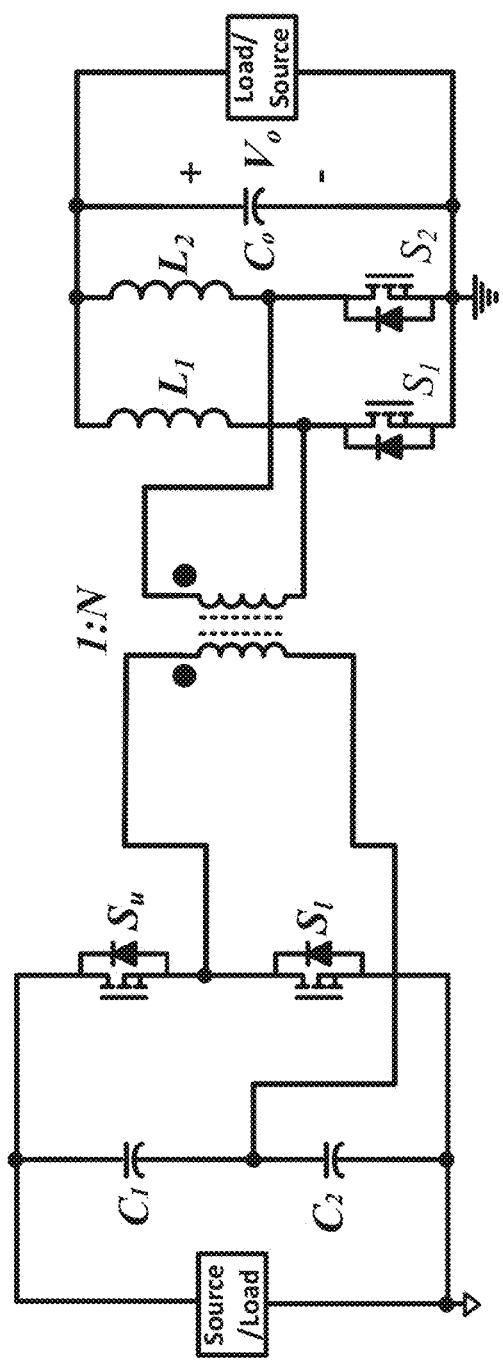

FIGS. 3A, 3B and 3C illustrate different power magnetic device configurations: (A) power transformer, (B) inversely coupled power inductor, and (C) power magnetic device configuration of interest, as described herein. FIGS. 4A, 4B and 4C illustrate exemplary DC-DC power converters: (A) buck/boost power converter, (B) two-phase boost power converter with coupled inductors, and (C) isolated half-bridge with current-doubler power converter. Referring now to FIGS. 4A and 4B, example power converter circuits are shown. For example, a buck power converter circuit is shown on the left hand side of FIG. 4A, and a boost power converter circuit is shown on the right hand side of FIG. 4A. Each power converter circuit includes a power inductor L.

Power converter circuits (as well as power inverter circuits) are well known in the art. It should be understood that the systems, devices, and methods described herein can be implemented using power converter or inverter circuits other than buck and boost power converters, which are provided as examples only. By taking an existing power converter or inverter circuit, such as the example circuits shown in in FIGS. 4A and 4B, for example, and adding an additional winding 110 (e.g., see FIG. 7), the power inductor L and its related converter/inverter switches can be used to supply both DC power to a DC power output while at the same time supplying AC power to another output.

FIG. 3A shows a power transformer that can be used between the half-bridge primary-side and the current-doubler secondary-side in an isolated converter such as the exemplary one shown in FIG. 4C. The power transformer's primary and secondary voltages and currents (before rectification) are AC with no DC values (ideally). This is unlike the case for two coupled power inductors such as those shown in FIG. 3B, which are used in a two-phase DC-DC power converter such as the exemplary one shown in FIG. 4B by paralleling two converters of the one shown in FIG. 4A and phase shifting their pulse width modulation (PWM) control by 180°. In the coupled power inductors of FIG. 3B or FIG. 4B, the two inductors carry DC currents with switching AC ripples, such as the switching ripple shown in FIG. 5. FIG. 3C shows an exemplary power magnetic device which can be used as a part of the systems described herein. In this case, one side (left side) carries DC current in addition to AC ripple while the other side carries only AC current (right side). In other words, the right side "harvests" the AC ripple or the "pickup AC power signal" represented by the AC ripple from the left side.

Figure 1:
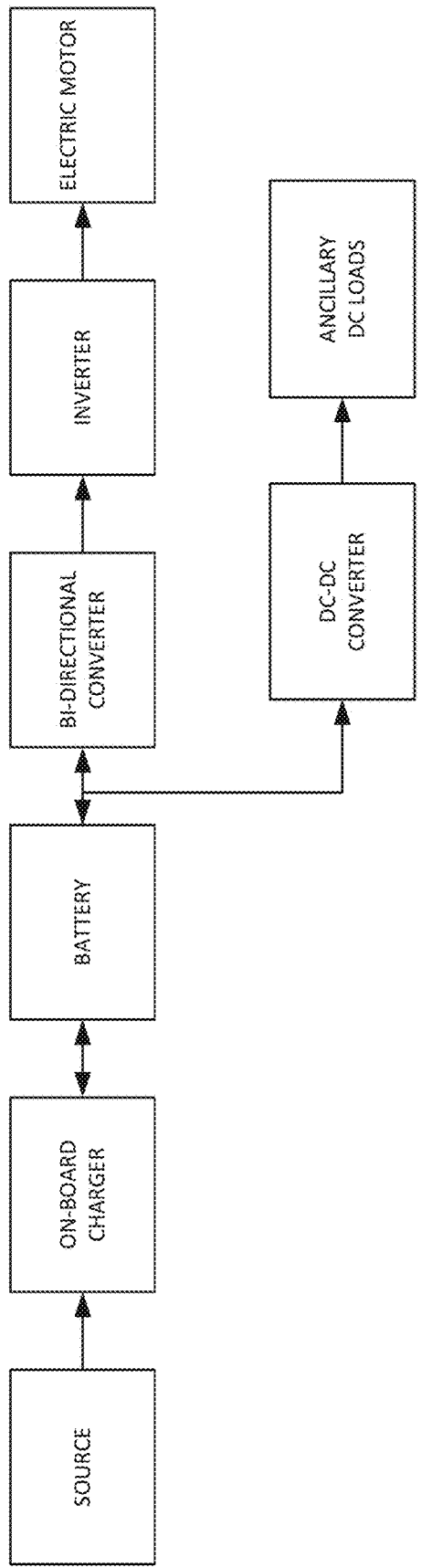
FIG. 1 illustrates a general simplified example block diagram of an Electric Drive Traction System (ETDS) for an Electric Vehicle (EV).
Figure 2:
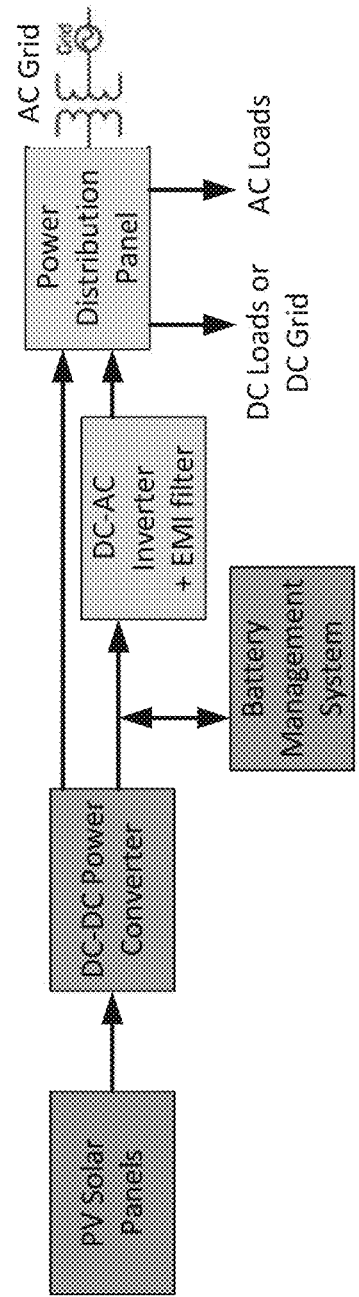
FIG. 2 illustrates a general simplified example block diagram of a PV solar system with energy storage.

There are variety of DC-AC inverter topologies that are discussed in the literature with different ways to categorize them (e.gs. voltage-source inverters versus current-source inverters and single-stage inverters versus two-stage inverters, among others). That said, for a system that requires supplying power to an AC load from a DC source, such as those shown in FIG. 1 and FIG. 2, a power electronic circuit is needed for DC-AC inversion and another power electronic circuit is needed for DC-DC regulation before the inversion circuit, regardless if they are combined as a single-stage or two-stage. Moreover, if the system requires supplying power to a DC load or a battery for energy storage, such as in FIG. 1 and FIG. 2, without affecting the regulation at the AC load, an additional DC-DC power converter is needed.

Figure 7:
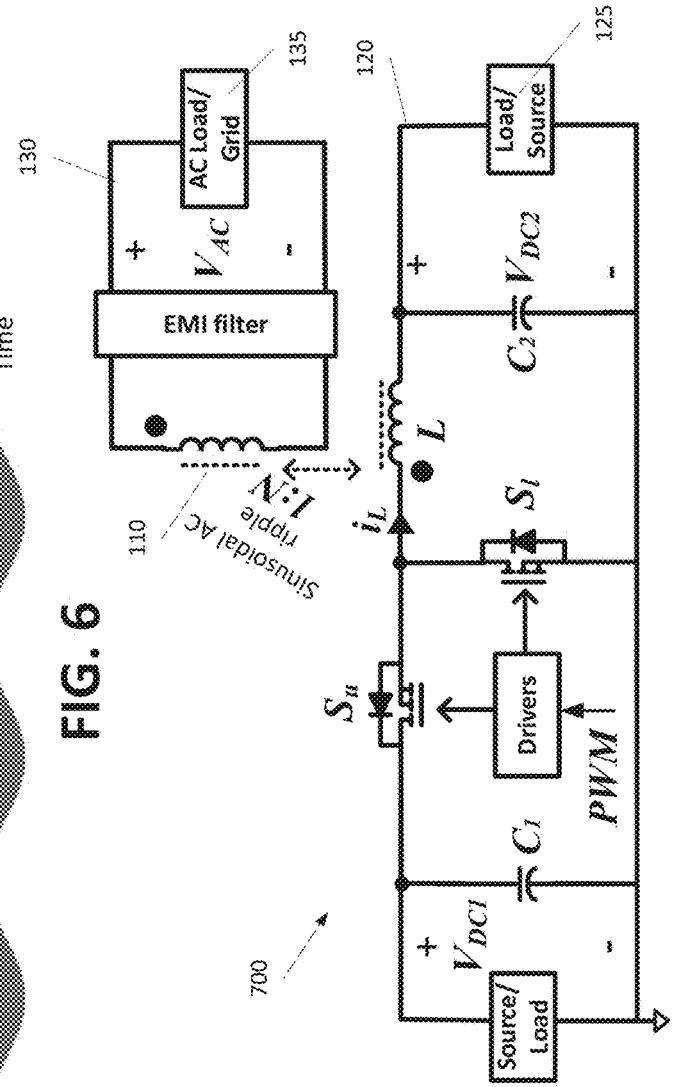
FIG. 7 is a partial illustration of an exemplary dual-type output power Inversion/Conversion (In-Con-version) converter.
Figure 8:
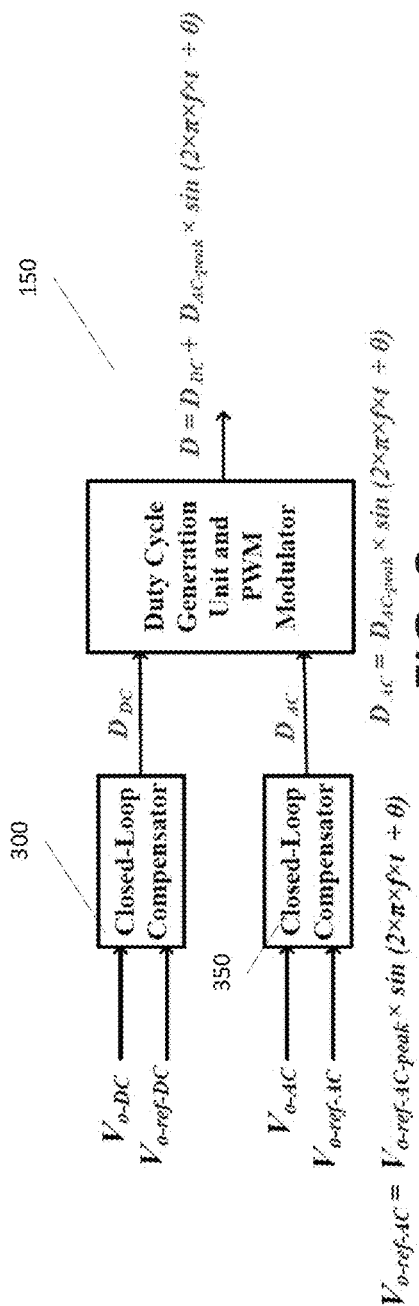
FIG. 8 is a partial illustration of a conceptual block diagram of an exemplary controller (In-Con-version controller) for a dual-type output power inversion/conversion (In-Con-version) converter.

FIG. 7 partially illustrates an exemplary dual-type output power inversion/nonversion (In-Con-version) power electronic circuit (hereinafter referred to as an In-Con-version circuit or converter or as a power converter or inverter circuit) 700 while FIG. 8 illustrates a block diagram of an exemplary In-Con-version voltage-mode controller (an exemplary current-mode In-Con-version controller would be similar with reference current instated of reference voltage) 150. The exemplary device of FIG. 7 utilizes the power magnetic device type illustrated in FIG. 3C.

1. Referring now to FIG. 7, an example power converter or inverter circuit 700 is shown. The example power converter or inverter circuit 700 can be used in any of the systems, devices, or methods for simultaneous transfer of AC and DC power described herein. The power converter or inverter circuit 700 can include a switch $S_u$ (upper switch) or $S_l$ (lower switch), a power magnetic device comprised of inductor L (first winding) inductively coupled with at least one additional winding 110 (second winding), a DC power output loop 120 for delivering DC power to a DC load 125

(e.g., delivering $V_{DC2}$), and an AC power output loop 130 for delivering AC power to an AC load 135 (e.g., delivering $V_{AC}$). This disclosure contemplates that a winding of the power inductor L and/or additional winding 110 can be at least one of copper, gold, graphene, carbon nanotubes, a superconductor material, a piezoelectric material, or an RF element. In addition, this disclosure contemplates that the power inductor L and/or additional winding 110 can include a magnetic sheet or core. Furthermore, this disclosure contemplates that the power inductor L and/or additional winding 110 can include placed within its core or gap.

The magnetic sheet or core can improve inductance and coupling between the power inductor L and the additional winding 110 acting as a transformer for the AC power output loop. It should also be understood that the AC power output loop 130 can include a magnetic sheet or core as well. As described above, current (i.e., current $i_L$) flowing through the first winding of the power magnetic device (i.e., power inductor L) includes a DC component and an AC ripple component. The DC power can be a function of the DC component, and the AC power can be a function of an AC ripple component. As described herein, the AC ripple component can be induced AC ripple component, or the naturally existing switching AC ripple component, or both at the same time. It should be understood that the AC ripple component will be present when current (i.e., current $i_L$) flows through the power inductor L regardless of whether an AC load (e.g., AC load 135) is present or not present. Optionally, this disclosure contemplates that the DC load can be a battery and the AC load can be an AC grid.

Figure 17:
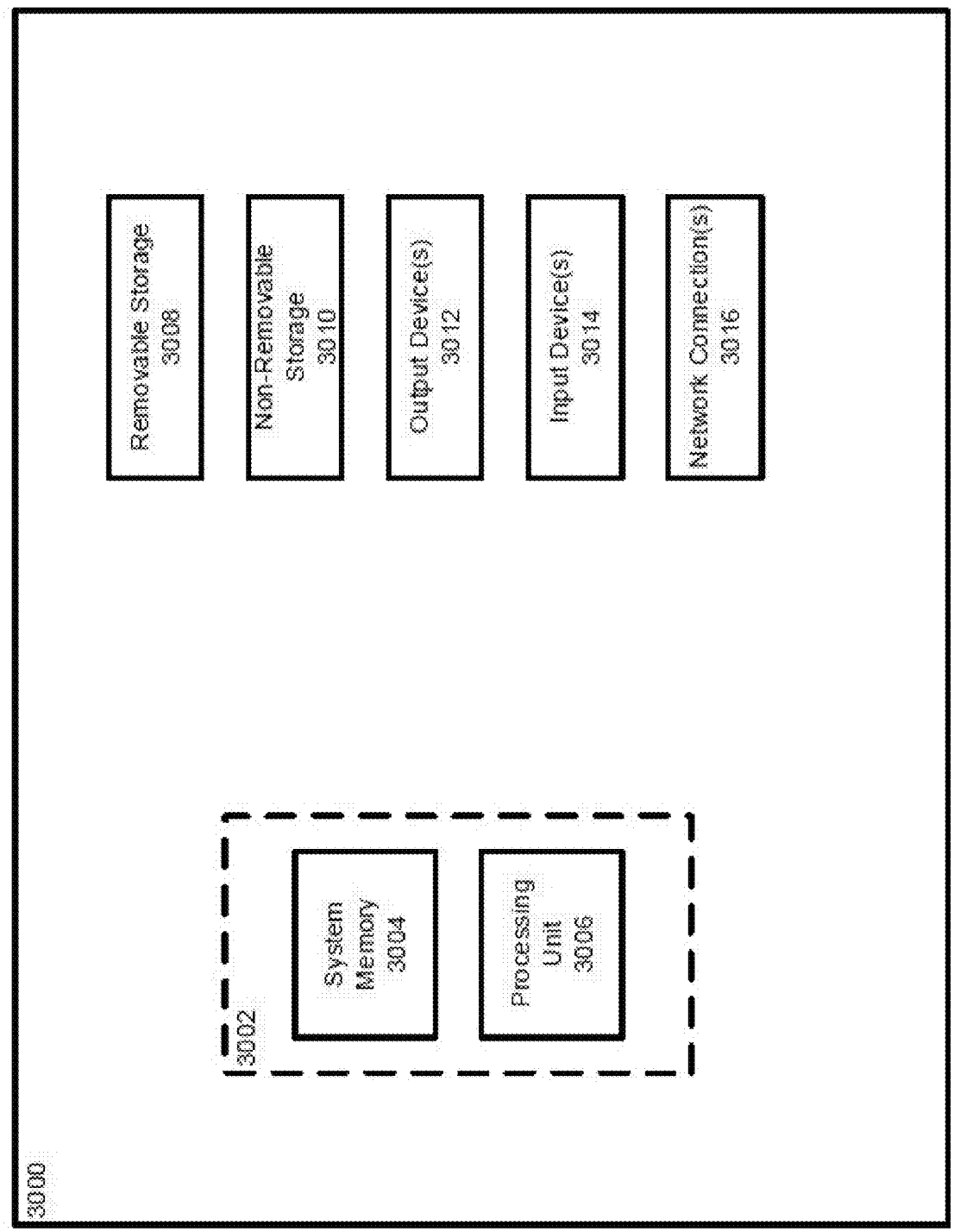
FIG. 17 illustrates an example computing device that may be used to practice aspects described herein.

In addition, the power converter or inverter circuit 700 can be operably coupled to a controller 150. The power converter or inverter circuit 700 and the controller 150 can be operably coupled through one or more communication links. This disclosure contemplates the communication links are any suitable communication link. For example, a communication link may be implemented by any medium that facilitates data exchange between the power converter or inverter circuit 700 and the controller 150 including, but not limited to, wired, wireless and optical links. The controller 150 can include a processing unit and a memory (e.g., a computing device 3000 as shown in FIG. 17), and the controller 150 can be configured to independently regulate the DC power and the AC power. It should be understood that the controller 150 can be configured to regulate at least one of a voltage, a current, or a power of the DC power independently of regulating at least one of a voltage, a current, or a power of the AC power.

The power converter or inverter circuit 700 can include pulse width modulation (PWM) generator operably coupled to the controller 150. The PWM generator can be configured to transmit control signals to drive the switches $S_u$ and $S_l$. In addition, a power source (e.g., $V_{DC1}$ or $V_{DC2}$) can be operably coupled to the power converter or inverter circuit 700. The power source can be a battery, a solar cell, a fuel cell, a thermal cell, including combinations thereof. It can also include any power source type that is rechargeable or not rechargeable. It should be understood that the power source can supply power to the power converter or inverter circuit 700 and can also receive power from the power converter or inverter circuits, its DC output, and/or its AC output. When the power source receives power from its DC and/or AC outputs, it should be understood that the DC and/or AC outputs act as inputs to charge the power source.

As described herein, the controller 150 can be configured to independently regulate the DC power and the AC power by altering at least one of (i) a signal that controls a duty cycle of the switch $S_u$ or $S_l$, or (ii) a signal that controls a switching frequency of the switch $S_u$ or $S_l$.

Figure 5:
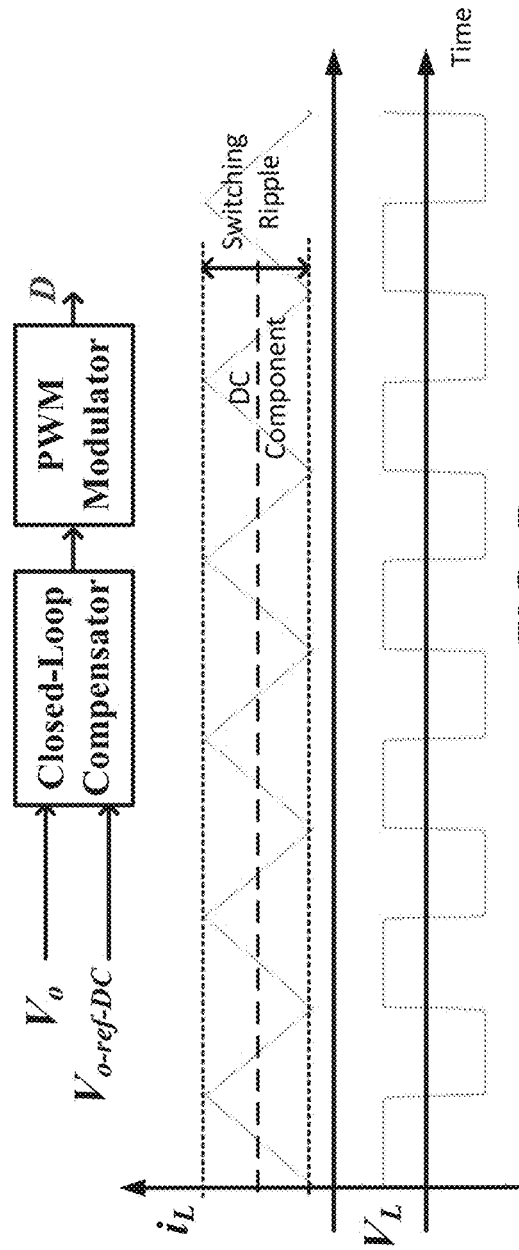
FIG. 5 illustrates exemplary current and voltage waveforms of the inductor in FIG. 3A under constant duty cycle value (D=0.5 in this case).
Figure 6:
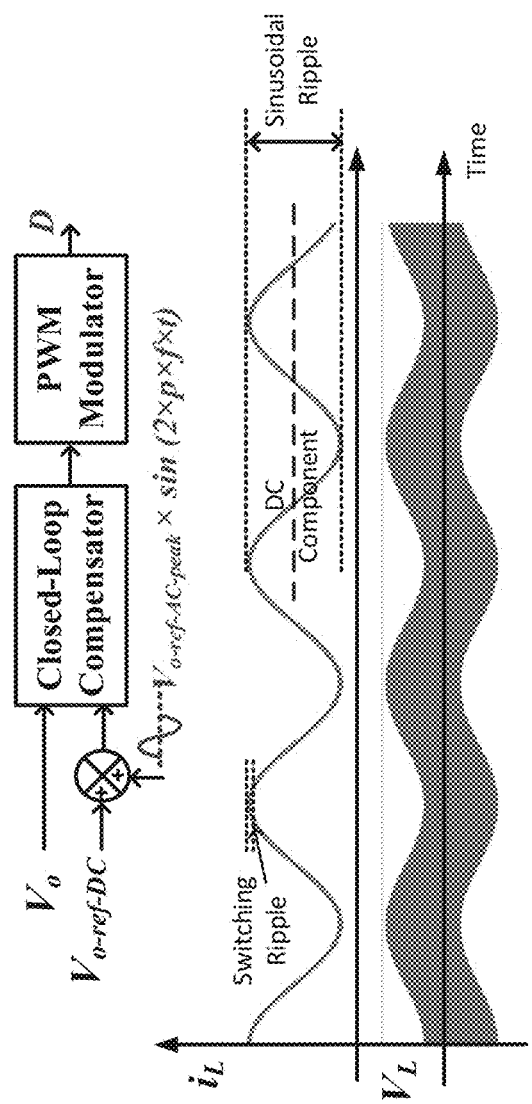
FIG. 6 illustrates current and voltage waveforms of the inductor in FIG. 3A under sinusoidally modulated duty cycle with DC offset ($D=D_{DC}+D_{AC\text{-}peak} \times \sin(2 \times \pi \times f \times t + \theta)$).

FIG. 5 shows the waveforms of the voltage and current of the inductor in a buck/boost power converter, which is used as an example here. These waveforms are under steady-state condition and when the reference voltage ($V_{o\text{-}ref\text{-}DC}$) of the closed-loop controller is a constant value (e.g., D=0.5). On the other hand, FIG. 6 shows the waveforms when the reference voltage or reference current is sinusoidally modulated around a DC value in the form of Equation (1). In this case, the inductor current will have an induced sinusoidal ripple in addition to its DC value (and the switching ripple). The voltage of the inductor will also have sinusoidal ripple but the average voltage across the inductor will still be zero as it should be.

$$V_{o\text{-}ref}=V_{o\text{-}ref\text{-}DC}+V_{o\text{-}ref\text{-}AC\text{-}peak}\times\sin(2\times\pi\times f\times t+\theta) \quad (1)$$

The induced sinusoidal ripple can be caused by perturbing a signal that controls the duty cycle of the switch $S_u$ or $S_l$. This perturbation can cause a change in the induced AC ripple component of the current of the power inductor L, which causes varying magnetic field for AC power transmission through the additional winding 110 (while maintaining a DC component as required by the DC output or load). This is sometimes referred to herein as the induced perturbation ripple technique. It should be understood that the controller 150 can be configured to regulate the DC power by adjusting a signal that controls the duty cycle of the switch $S_u$ or $S_l$. For example, the DC power of the power converter or inverter circuit 700 can be well regulated by controlling the duty cycle of switch $S_u$ (i.e., the upper switch). The duty cycle of switch $S_u$ can be defined by D=ton/Ts, which is the ratio between the upper switch ON time and the switching period (i.e., upper switch ON time plus upper switch OFF time). Additionally, a DC value of the duty cycle control signal $D_{DC}$ shown in FIG. 8 can be used to regulate the duty cycle of switch $S_u$ and therefore also regulate the DC power delivered through the DC power output loop 120. As shown in FIG. 8, a first closed control loop 300 can be implemented for independent regulation of the DC power delivered through the DC power output loop 120, and a second closed control loop 350 can be implemented to control the AC power delivered through the AC power output loop 130. To perturb duty cycle control signal $D_{DC}$, the controller 150 can introduce a time-varying perturbation to duty cycle control signal $D_{DC}$. The time-varying perturbation can be a sinusoidal or non-sinusoidal waveform including, but not limited to, a square wave, sawtooth wave, or other non-sinusoidal waveform. For example, a small duty cycle sinusoidal perturbation can be added to duty cycle control signal $D_{DC}$ in order to generate additional induced AC ripple in the power inductor L, which causes varying magnetic field for AC power transmission. The AC power can be regulated by adjusting a peak-to-peak value and/or frequency and/or phase angle of the time-varying perturbation.

Figure 9:
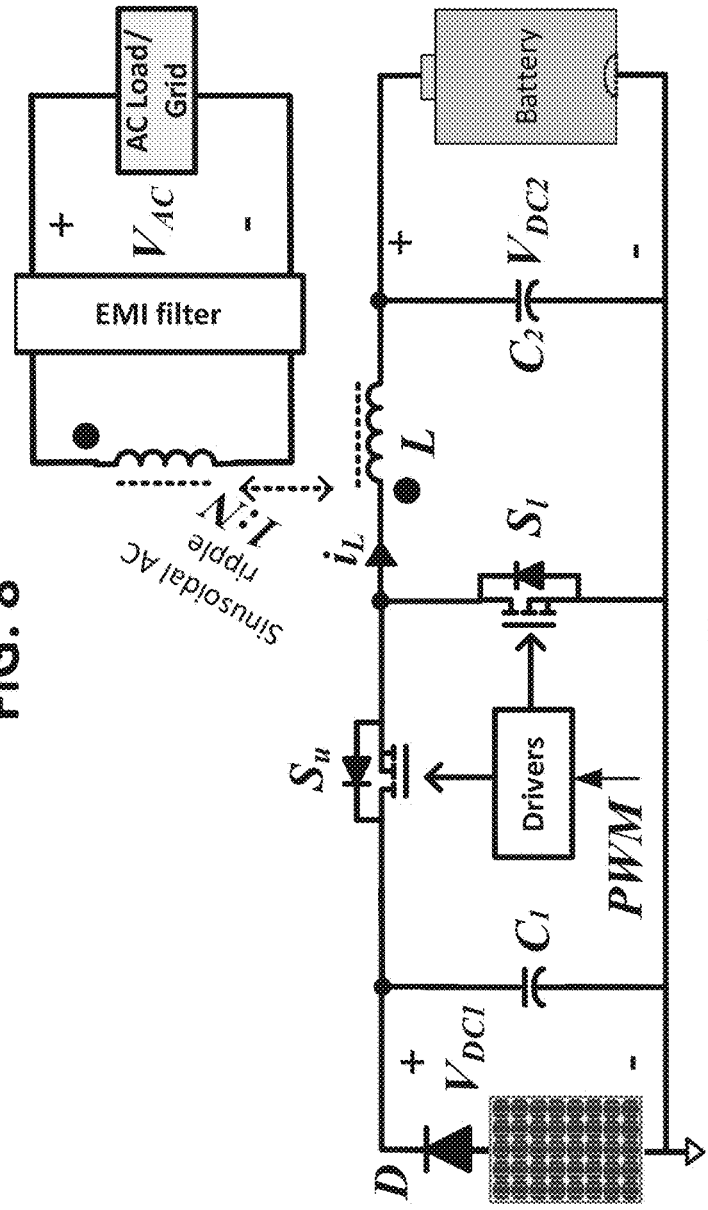
FIG. 9 is an illustration of the exemplary In-Con-version system of FIG. 7 modified for PV solar renewable energy application with battery charging (PV panel and battery can be switched at the two DC sides).

Referring now to FIG. 7 and FIG. 9 (a PV solar system example for illustration purposes), the left side terminals (where $V_{DC1}$ is) receives power/energy from PV solar panel(s) and the right side terminals (where $V_{DC2}$ is) has a battery pack (the panel and battery can be swapped at the two converter's DC sides), while the top side terminals (where VAC is) are connected to power an AC load or supply energy to an AC grid.

In FIG. 8 and FIG. 9, $V_{o\text{-}DC}=V_{DC2}$ and $V_{o\text{-}AC}=V_{AC}$ from FIG. 7. The DC output is regulated by the described closed-control-loop controller which generates $D_{DC}$ while the AC output is regulated by the closed-control-loop which generates $D_{AC\text{-}peak}$, f, and θ. There are several possible operational possibilities as described below.

In one operational possibility, a source energy (from PV panels in this example) charges the load/batteries and no AC output is desired. In this case, the controller sets $D_{AC\text{-}peak}=0$ and generates $D_{DC}$ to regulate/charge the DC output. $D_{DC}$ can be regulated in various ways including by a voltage-mode closed-loop controller (e.g. constant voltage charging mode), a current-mode closed-loop controller (e.g. constant-current charging mode), or by a Maximum Power Point Tracking (MPPT) controller.

In another operational possibility, source energy supplies energy to an AC load or an AC grid without delivering energy to the DC load/battery. In this case the battery should be disconnected (by a disconnect switch or relay), $D_{DC}$ is set to a fixed value (e.g. 0.5) and the closed-loop controller generates $D_{Ac\text{-}peak}$, f, and θ.

In yet another operational possibility, source energy is not sufficient (e.g. no PV panel solar energy at night) and the battery is needed to deliver energy to the AC load or AC grid. In this case, $D_{DC}$ is set to a fixed value (e.g. 0.5) and the closed-loop controller generates $D_{AC\text{-}peak}$, f, and θ. Note that in this case there will be a voltage across the capacitor C1 at the PV solar input side but no energy will go to the PV panels because the diode usually placed in series with the PV panels for protection is reversed biased.

Another operational possibility is when both DC output and AC output are desired to be available at the same time. In this case and as illustrated in FIG. 8, the DC output is regulated by $D_{DC}$ and the AC output is regulated by $D_{AC\text{-}peak}$, f, and θ, simultaneously. Using the In-Con-version under this operation scenario means that there will be sinusoidal ripple imposed on the DC output with a magnitude that depends on the desired AC output peak value and the turns ratio 1:N in FIG. 7. If this is acceptable, such as in the case of charging a battery as in the example system described herein, then it would be acceptable. Otherwise, a solution is needed to reduce or eliminate this sinusoidal ripple as presented in the next section of this disclosure. Note that charging a battery with a DC value that has sinusoidal ripple is acceptable and in some cases it might be of advantage.

It is to be noted that for the PV solar system example application, during daytime the PV panel(s) can be charging the battery and supplying power to the grid by using time multiplexing such that one output is active at a given time (DC or AC) or both outputs are active simultaneously. During night time, the battery can supply power the AC load or grid while also supplying power to other loads through other power converters if desired.

As described above, if it is desired that the two outputs, DC and AC, of the disclosed power converter or inverter circuit to be active at the same time, the drawback would be the added sinusoidal ripple at the DC output (no impact on the AC output), which in some cases would be acceptable, if not beneficial, for battery charging. However, if the DC load requires low ripple supply, a solution is desired in order to make simultaneous DC and AC power delivery practical.

One solution, which can be used in applications where very tight regulation is required, is to use another DC-DC power converter between the DC output and the DC load. The switching frequency of the additional DC-DC power converter should be much higher (e.g. >>10 times) than the sinusoidal ripple frequency. If the sinusoidal ripple frequency is 60 Hz, several tens of kHz or more would be sufficient, which is a practical frequency range for DC-DC power converters. The drawback of this solution is having to add one more DC-DC power converter.

Figure 10:
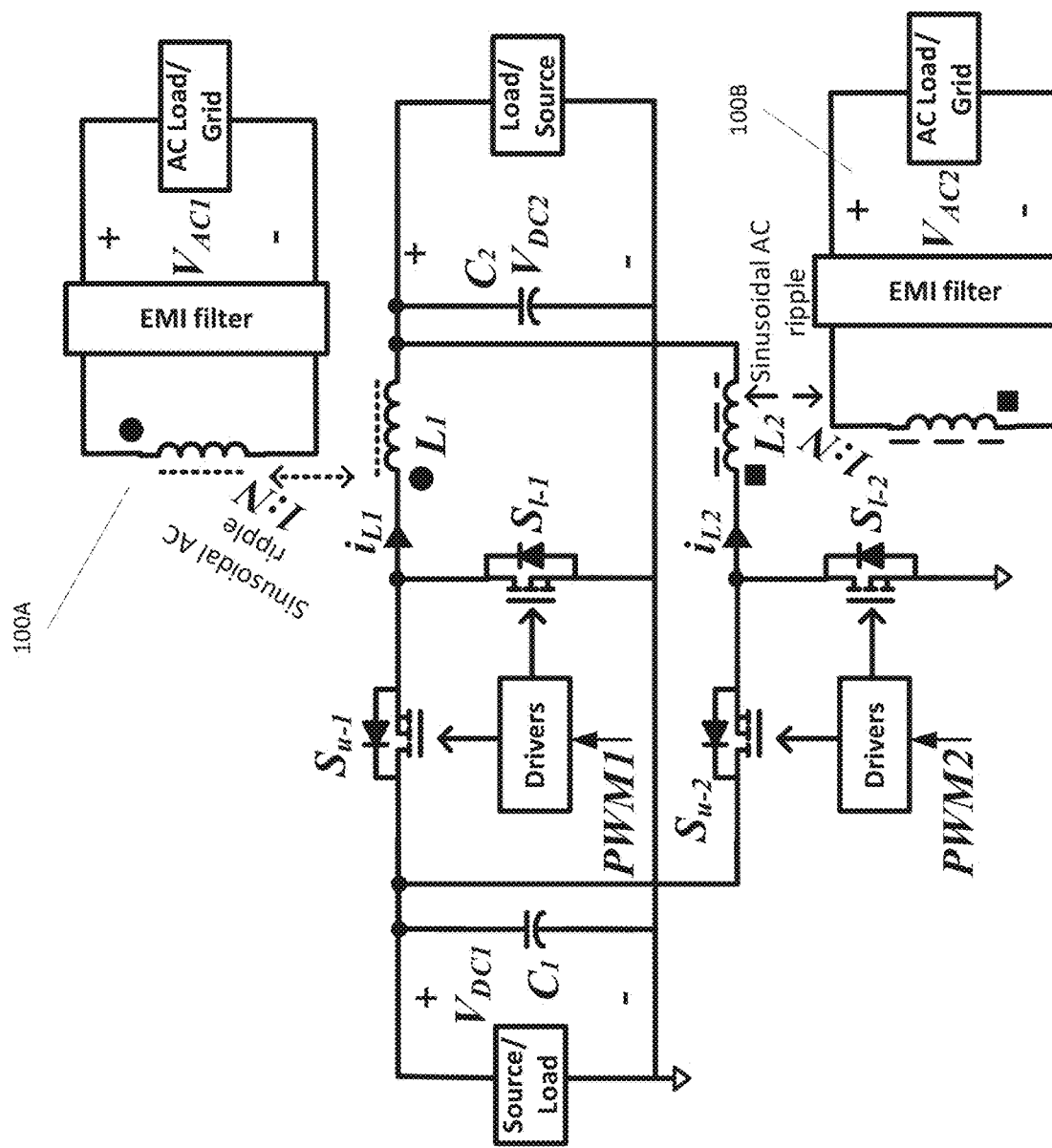
FIG. 10 is a partial illustration of an exemplary In-Con-version system with sinusoidal ripple cancellation at the DC output.
Figure 11:
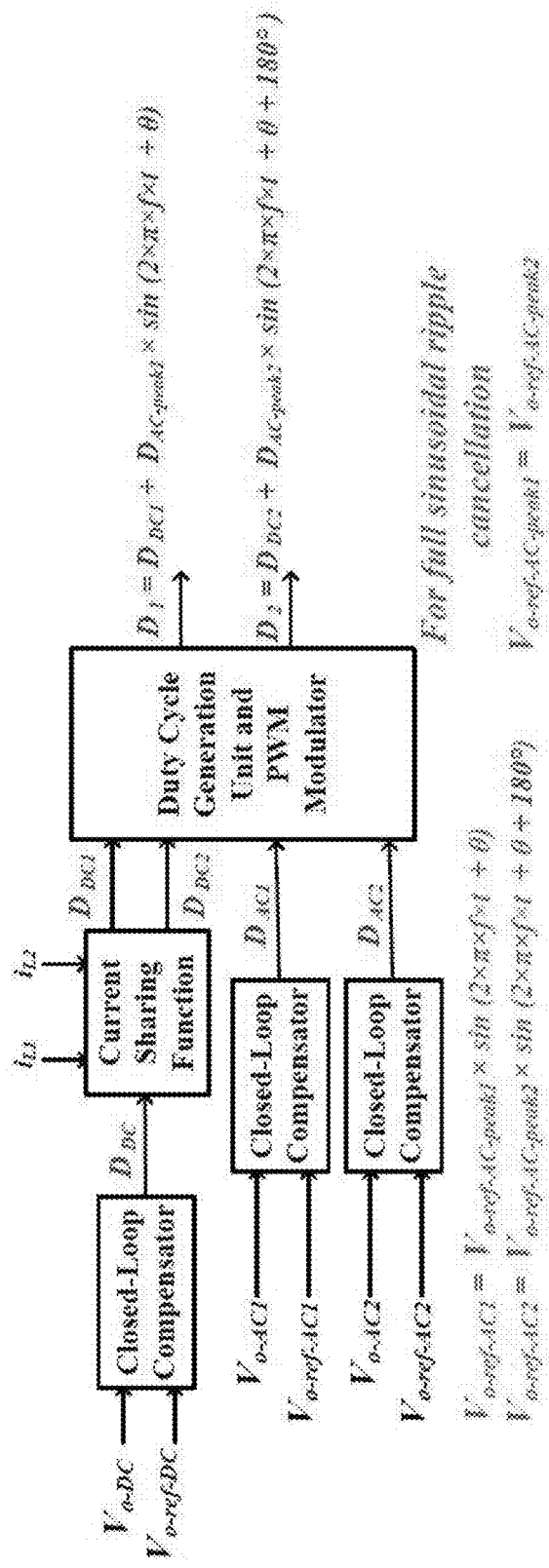
FIG. 11 is a partial illustration of a conceptual block diagram of an exemplary In-Con-version controller for an exemplary In-Con-version converter with sinusoidal ripple cancellation at the DC output.

Another solution is based on paralleled power converters which allows power to be divided between two lower power converters that are connected in parallel. As illustrated in FIG. 10 (two converters in parallel), while DC current sharing (equalization) is achieved using a conventional current sharing controller by generating $D_{DC1}$ and $D_{DC2}$, ($D_{DC1}=D_{DC2}$ ideally when both paralleled power converters are symmetric and practically they are slightly different for a closely matched design). The proposed concept is to phase shift the two AC output voltage references (not the switching PWM of the switches at the switching frequency level as in multi-phase converters) by 180° with respect to each other, as illustrated in FIG. 11. This way, while each power inductor has sinusoidal ripple which is transferred to each AC load (now one can have two AC outputs as shown on FIG. 10), the sum of the two shifted sinusoidal ripples (not the switching ripple here) will result in no added sinusoidal ripple at the DC output. By referring to FIG. 11, full/complete sinusoidal ripple cancellation can be achieved when $V_{o\text{-}ref\text{-}AC\text{-}peak1}=V_{o\text{-}ref\text{-}AC\text{-}peak2}$, which can be achieved or approximately achieved if the two AC outputs are connected to the same AC load or AC grid (this would be in parallel connection).

It should be noted that the addition of the paralleled power converter not only allows for implementing control which will lead to sinusoidal ripple cancellation at the DC load, but also allows for higher current/power at the DC load. For the same DC load current/power, smaller devices such as power magnetics can be used and better thermal distribution can be achieved.

In order to cancel the effect of the perturbation on the output voltage ripple at the DC power output, a plurality of power converter or inverter circuits can be connected in parallel (i.e., FIG. 10). It should be understood that the power converter or inverter circuits of FIG. 10 share many of the same features as the power converter or inverter circuit 700 of FIG. 7. Accordingly, some features of the power converter or inverter circuits of FIG. 10 are not described in further detail below. Additionally, although two power converter or inverter circuits are shown as examples in FIGS. 10, 13-14, it should be understood that more than two power converter or inverter circuits can be used as described below.

Figure 13:
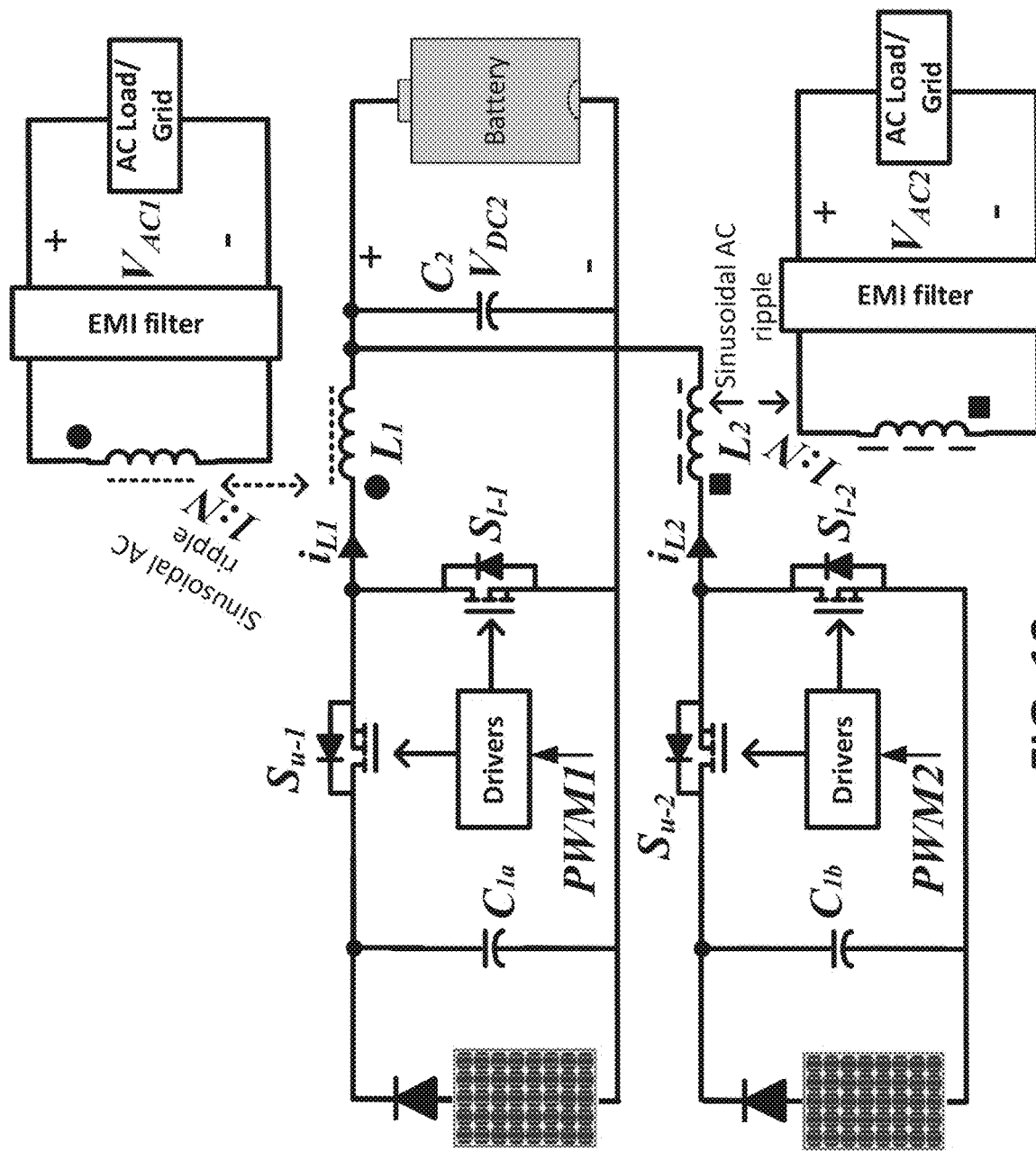
FIG. 13 illustrates the exemplary In-Con-version system of FIG. 10 modified for a PV solar renewable energy application with battery charging with two separate inputs and with sinusoidal ripple cancellation at the DC output.
Figure 14:
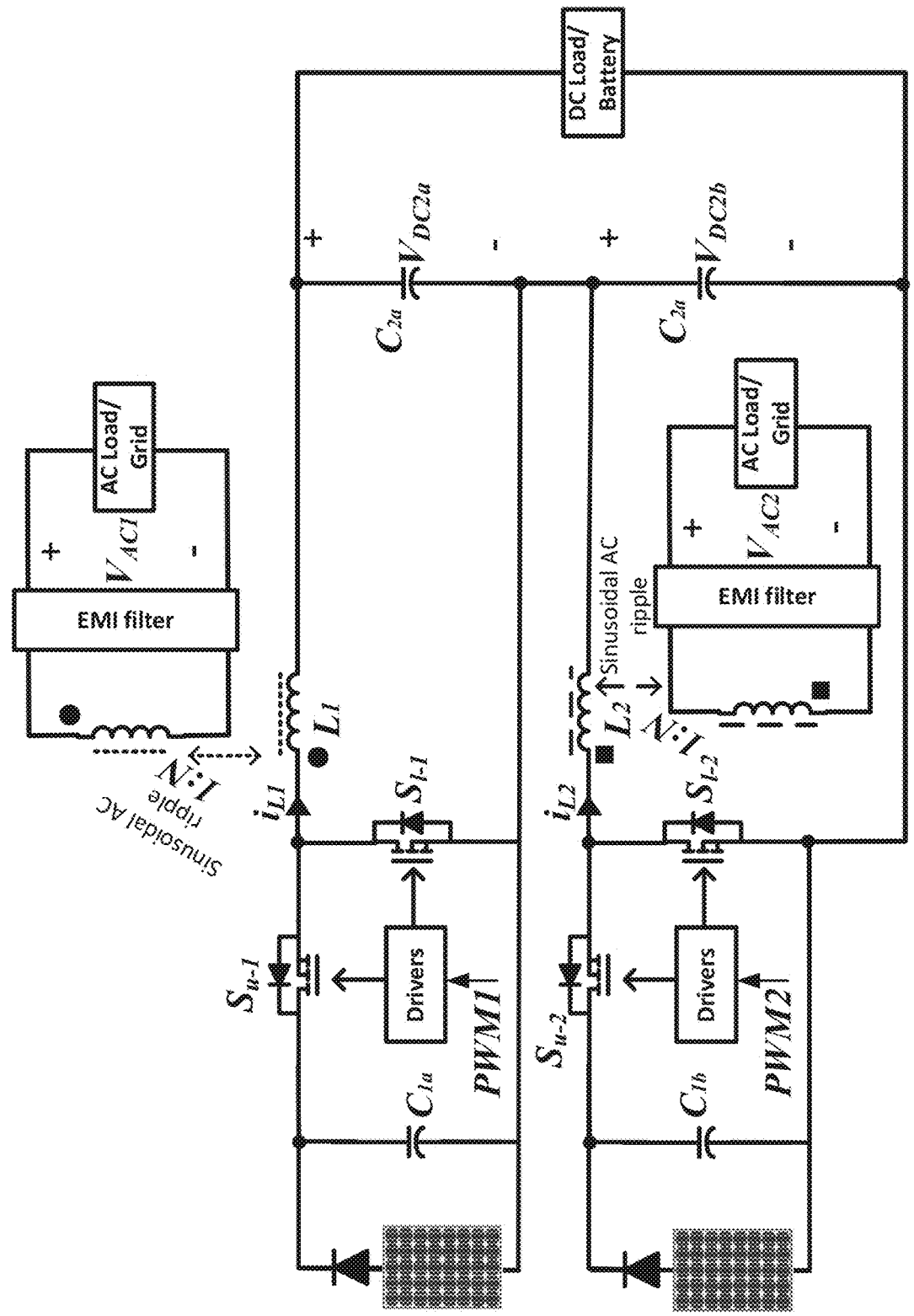
FIG. 14 illustrates the exemplary In-Con-version system of FIG. 10 and/or FIG. 13 for PV solar renewable energy application with two separate inputs, in series output connection, and with sinusoidal ripple cancellation at the DC output.

In each power converter or inverter circuit, the respective sinusoidal perturbation signals can be phase shifted relative to each other such that the net perturbation ripple is reduced, e.g., cancelled to zero. In FIGS. 10, 13-14, the phase shift between the two perturbation signals is 180 degrees (i.e., 360/N, where N=2). This disclosure contemplates that more than two power converter or inverter circuits can be connected (e.g., N>2). For example, if three power converter or inverter circuits are used, phase shift can be 120 degrees (i.e., 360/N, where N=3).

Similar to above, closed control loops can be implemented for independent regulation of the DC and AC power outputs. For example, the AC output loops from each of the power inductors can be left independent or disconnected such that each of the AC output loops can be regulated by adjusting dp1 and dp2 values, respectively. In other words, a first closed control loop can be implemented for independent regulation of the DC power delivered through the DC power output loop, a second closed control loop can be implemented to control the AC power delivered through the first AC power output loop, and a third closed control loop can be implemented to control the AC power delivered through the second AC power output loop.

AC output power can be regulated by adjusting a frequency of a signal that controls the switching frequency of the switch $S_u$ or $S_l$. This perturbation can cause a change in the natural switching AC ripple component of the current of the power inductor L, which causes varying magnetic field for AC power transmission through the additional winding 110. This is sometimes referred to herein as the natural switching ripple technique. The basic concept is that the DC power output of the power converter or inverter circuit (e.g., power converter or inverter circuit 700 of FIG. 7) can be well regulated by controlling the duty cycle of switch $S_u$ (i.e., the upper switch). As described above, the duty cycle of switch $S_u$ can be defined by D=ton/Ts, which is the ratio between the upper switch ON time and the switching period (i.e., upper switch ON time plus upper switch OFF time). As described herein, the AC power output can be regulated by adjusting or varying the magnitude of the AC ripple of the current of the power inductor by controlling the switching frequency (e.g., fs=1/Ts) of the switches (e.g., switches Su and $S_l$ in the power converter or inverter circuit 700 of FIG. 7). In some of the power converter or inverter circuits such as the circuits, adjusting the switching frequency affects the AC power output but does not affect the regulation of the DC power output. For example, by increasing the switching frequency (i.e., $f_{s2} > f_{s1}$), it is possible to decrease the magnitude of the AC ripple component, which decreases the AC power output. Conversely, by decreasing the switching frequency, it is possible to increase the magnitude of the AC ripple component, which increases the AC power output.

Alternatively or additionally, one or both of the power inductor L and the additional winding 110 can be a variable inductor. It is also possible to regulate the AC power output by adjusting an inductance value of the variable inductor. This adjustment can cause a change in the AC ripple component of the current of the power inductor L or the additional winding 110, which causes varying magnetic field for AC power transmission. For example, by increasing the inductance value (i.e., $L_b > L_a$), it is possible to decrease the magnitude of the AC ripple component, which decreases the AC power output. Conversely, by decreasing the inductance value, it is possible to increase the magnitude of the AC ripple component, which increases the AC power output.

Referring again to FIGS. 7 and 8, the controller 150 can be configured to control a bidirectional flow of the DC power or the AC power between the power source (e.g., a battery, a solar cell, a fuel cell, a thermal cell, etc.) and the DC power output loop 120 and/or the AC power output loop 130. As described above, the DC load 125 and/or AC load 135 can be a battery or other powered device. This disclosure contemplates that the controller 150 can be configured to control the flow of energy or power in any direction, e.g., from the power source to the DC and AC power output loops 120 and 130 or from one of the power output loops to the power source and the other power output loop. For example, in one mode of operation, energy or power can be supplied from a power source to a battery (or batteries) charging at one (or both) of the DC or AC power output loop. While in another mode of operation, the battery (or both batteries) can supply energy or power. Alternatively or additionally, the controller 150 can be configured to control the bidirectional flow of the DC power or the AC power to maximize efficiency. Alternatively or additionally, the controller 150 can be configured to control the bidirectional flow of the DC power or the AC power to perform maximum power point tracking (e.g., maximum power point tracking can be performed when the power source is a solar cell or fuel cell).

Figure 12:
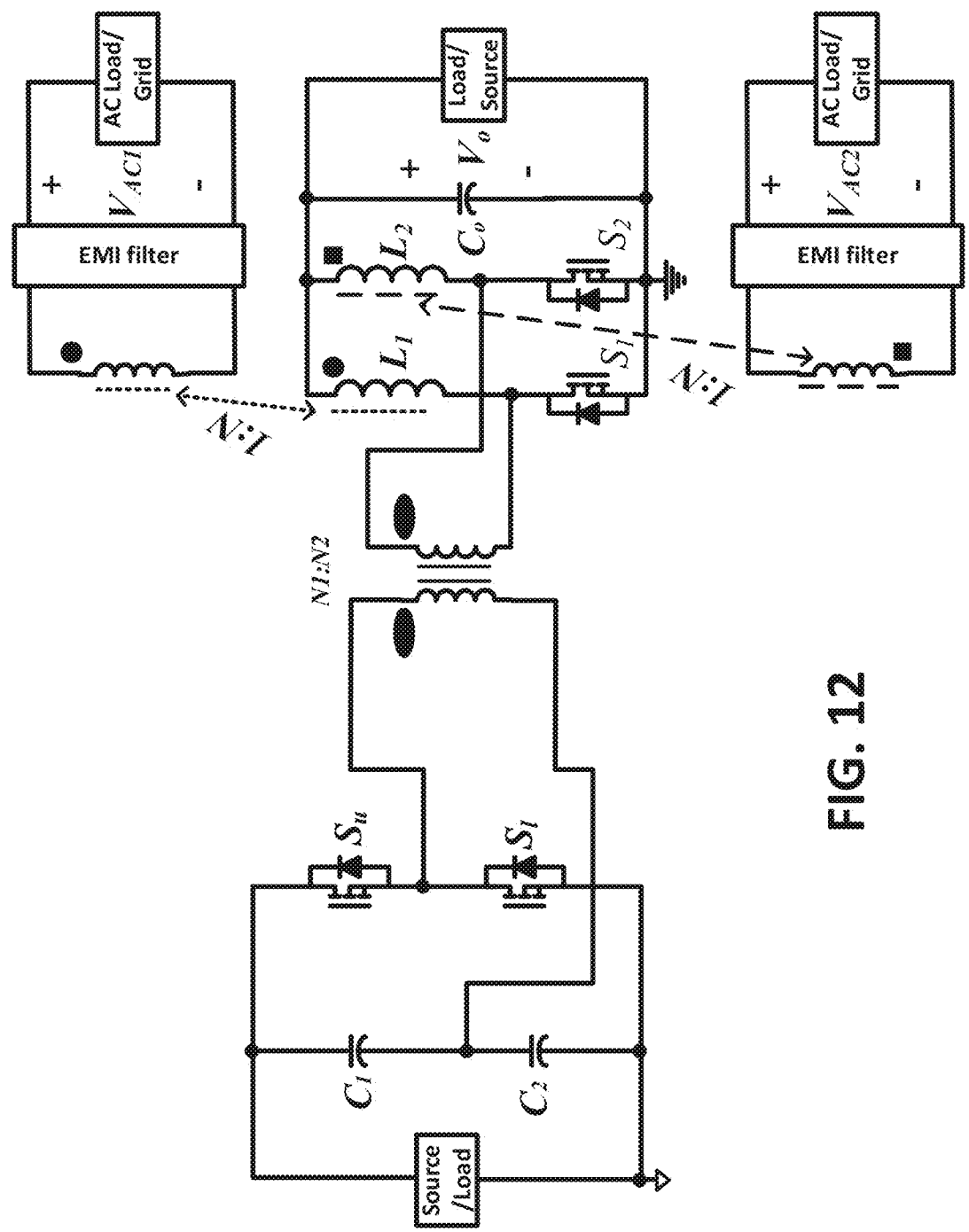
FIG. 12 is a partial illustration of an exemplary isolated Half-Bridge Current-Doubler In-Con-version converter with sinusoidal ripple cancellation at the DC output.

FIG. 12 shows an illustration how the same concept can be applied to an isolated power converter topology. In this example, one side is half-bridge (or full bridge) and the other side is a current doubler. The same concept with (or without) ripple cancellation at the DC output can also be realized.

It should be noted that the input side of the two channels of power converter or inverter circuit shown in FIG. 10 can be separated to handle two separate inputs as illustrated in FIG. 13 for the example application of PV solar renewable energy application with battery charging. In this case, MPPT control can be performed for each input independently while charging a battery or supplying power to a DC load and to one or two AC loads while achieving low cost and high density. It should also be noted that the output side of the two channels of the power converter or inverter circuit shown in FIG. 10 and FIG. 13 can be connected in series instead of in parallel if high voltage is desired at the DC output, as illustrated in FIG. 14. Also in this case, ripple cancellation can be achieved by a voltage sharing controller with phase shifting instead of current sharing controller.

Because the disclosed and described power converter or inverter circuit can be applied to many types of power converters, there are many options for EV applications. For example, FIG. 15 illustrates an exemplary In-Con-version topology that may be used for an EV application.

Figure 15:
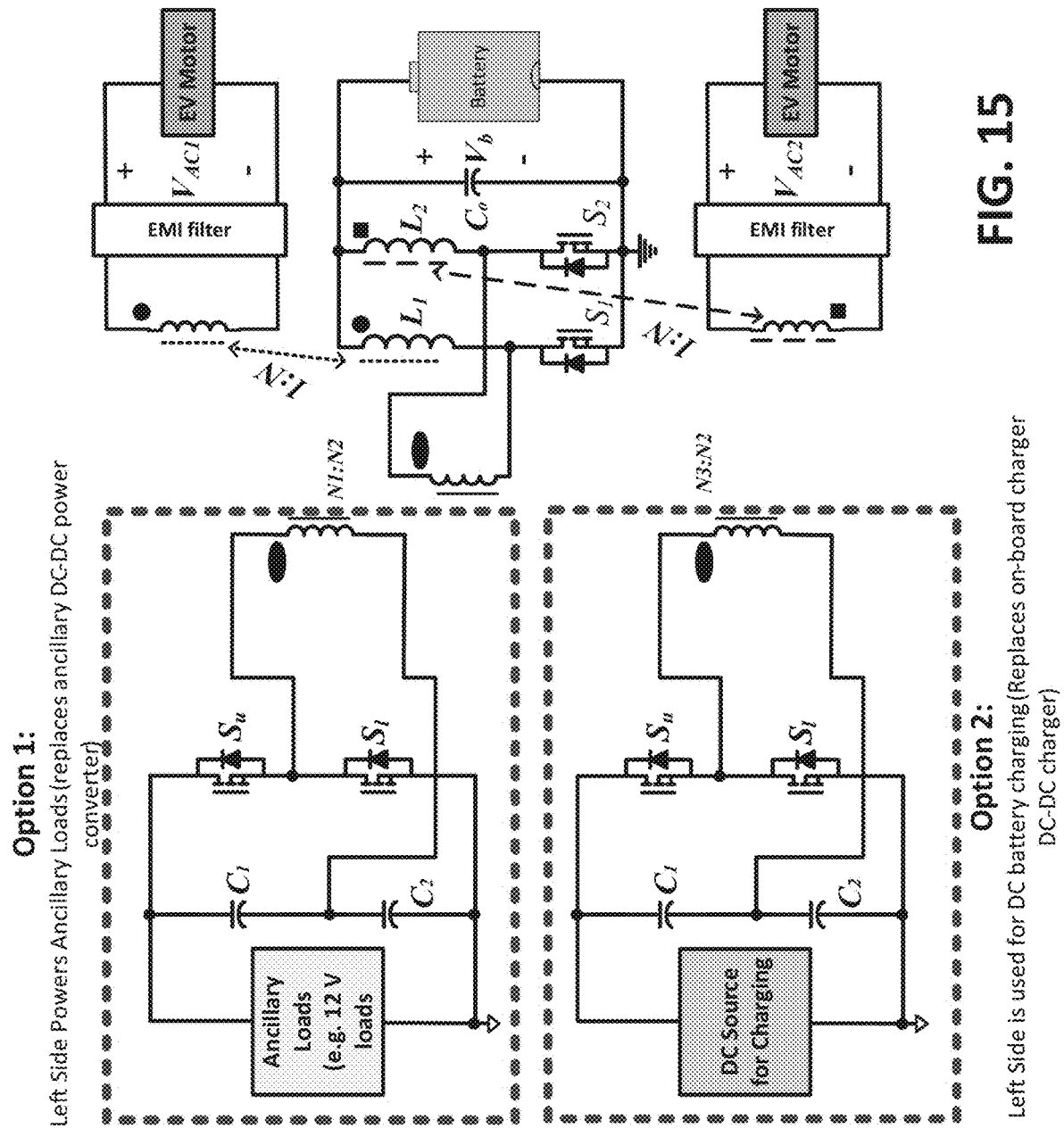
FIG. 15 illustrates an exemplary In-Con-version system for an EV application.

Consider the case when the circuit shown in FIG. 15 as Option 1 is used at the left side (no Option 2 circuit). In this case, this power converter or inverter circuit with the appropriate control based on the concepts discussed earlier replaces the DC-DC converter and inverter(s) between the battery and the motor(s) and replaces the DC-DC power converter between the battery and the ancillary loads of the EV. The two AC outputs, $V_{AC1}$ and $V_{AC2}$, can be used to power one motor (replacing one inverter) or can be used to power two separate motors (replacing two inverters) in EVs with two motors (e.g. one for the right wheel and one for the left wheel). The voltage and frequency can be controlled independently for each AC output. Sinusoidal ripple cancellation at the battery can be achieved with this configuration and controller presented earlier in this proposal. Variable-frequency-drive can also be achieved.

In the case where the circuit labeled as Option 2 in FIG. 15 is used on the left side, (no Option 1 circuit), the left side can be used when an on-board DC charger is desired. This option is mentioned here for information. In some instances, both Option 1 circuitry and Option 2 circuitry may be used in the same EV.

Figure 16:
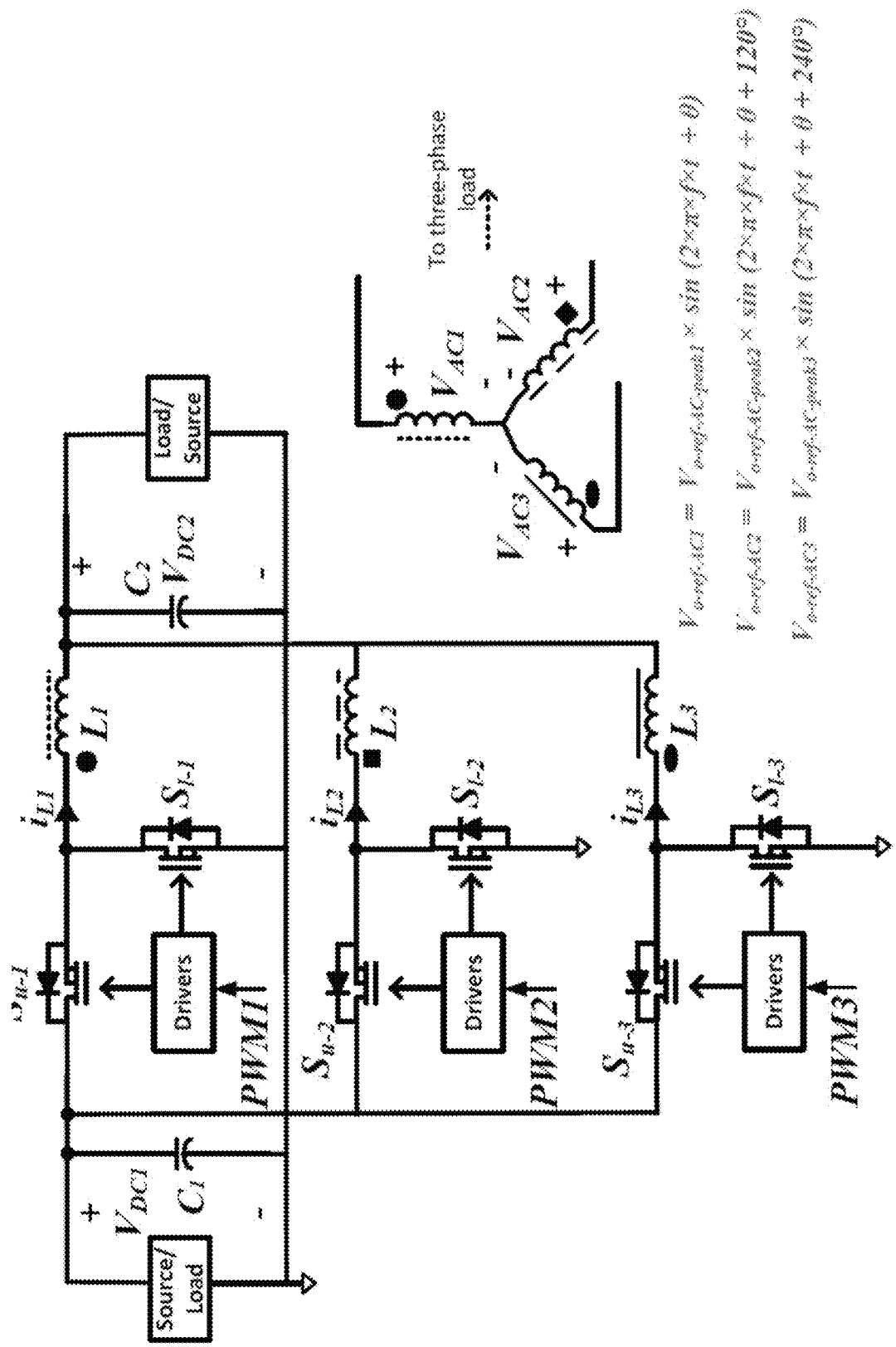
FIG. 16 illustrates an exemplary In-Con-version system for a three-phase load and a DC load with sinusoidal ripple cancellation at the DC output and DC load.

FIG. 16 shows an example illustration of how an embodiment of the power converter or inverter circuit can be extended to power three-phase AC load simultaneously while powering DC load with sinusoidal ripple cancellation. By using a similar concept to the ones presented earlier herein for sinusoidal ripple cancellation (see FIG. 10 and FIG. 11) at the DC output, three-phase AC output as illustrated in FIG. 16 can be realized. Three stages are paralleled and the reference voltages for $V_{AC1}$, $V_{AC2}$, and $V_{AC3}$ are shifted (0°, 120°, and 240°). It should be noted that the addition of the paralleled power converter not only allows for providing three-phase AC output while canceling the ripple at the DC output, but also allows for higher current/power the DC load. For the same DC load current/power, smaller devices such as power magnetics can be used and better thermal distribution can be achieved. If it is desired to realize AC output with more than three phases, additional stages can be added and the control references can be shifted as needed.

While the illustration of FIG. 16 shows one input, it can be modified to accept multiple input sources as it is the case in FIG. 13. Higher DC output voltage can also be achieved by a similar connection as shown in FIG. 14.

There are many switching power converter circuits that have been developed over the years along with associated control schemes. Each of those, especially the ones that utilizes one or more power inductors, is a candidate for an application of an In-Con-version topology as described herein with associated control methods disclose and described herein. The disclosed In-Con-version topologies allow for the utilization of the same power components to deliver multiple DC and AC outputs from the same circuit simultaneously or by time multiplexing. This is made possible by the disclosed control concepts, circuit modifications, and the use of power magnetic device which process DC current at one side, and AC current at the other side.

It should be appreciated that the logical operations described herein with respect to the various figures may be implemented (1) as a sequence of computer implemented acts or program modules (i.e., software) running on a computing device (e.g., the computing device described in FIG. 17), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 17, an example computing device 3000 upon which embodiments of the invention may be implemented is illustrated. It should be understood that the example computing device 3000 is only one example of a suitable computing environment upon which embodiments of the invention may be implemented. Optionally, the computing device 3000 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 3000 typically includes at least one processing unit 3006 and system memory 3004. Depending on the exact configuration and type of computing device, system memory 3004 may be volatile (such as random access memory (RAM)), non-volatile (such as read-only memory (ROM), flash memory, etc.), or some combination of the two. This most basic configuration is illustrated in FIG. 30 by dashed line 3002. The processing unit 3006 may be a standard programmable processor that performs arithmetic and logic operations necessary for operation of the computing device 3000. The computing device 3000 may also include a bus or other communication mechanism for communicating information among various components of the computing device 3000.

Computing device 3000 may have additional features/functionality. For example, computing device 3000 may include additional storage such as removable storage 3008 and non-removable storage 3010 including, but not limited to, magnetic or optical disks or tapes. Computing device 3000 may also contain network connection(s) 3016 that allow the device to communicate with other devices. Computing device 3000 may also have input device(s) 3014 such as a keyboard, mouse, touch screen, etc. Output device(s) 3012 such as a display, speakers, printer, etc. may also be included. The additional devices may be connected to the bus in order to facilitate communication of data among the components of the computing device 3000. All these devices are well known in the art and need not be discussed at length here.

The processing unit 3006 may be configured to execute program code encoded in tangible, computer-readable media. Tangible, computer-readable media refers to any media that is capable of providing data that causes the computing device 3000 (i.e., a machine) to operate in a particular fashion. Various computer-readable media may be utilized to provide instructions to the processing unit 3006 for execution. Example tangible, computer-readable media may include, but is not limited to, volatile media, non-volatile media, removable media and non-removable media implemented in any method or technology for storage of information such as computer readable instructions, data structures, program modules or other data. System memory 3004, removable storage 3008, and non-removable storage 3010 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 3006 may execute program code stored in the system memory 3004. For example, the bus may carry data to the system memory 3004, from which the processing unit 3006 receives and executes instructions. The data received by the system memory 3004 may optionally be stored on the removable storage 3008 or the non-removable storage 3010 before or after execution by the processing unit 3006.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A power converter or inverter circuit device for simultaneous transfer of alternating current (AC) and direct-current (DC) power, comprising:
   a power converter or inverter circuit comprising:
   a source, wherein the source provides a DC current having a DC power component, a switch connected to the source and configured to switch the source, wherein the switch induces a variable sinusoidal AC ripple in the DC current,
   a power inductor having a first winding on a first core, wherein a first side of the first winding is connected to the switch, said first winding carries an AC current and an AC power component both caused by the variable sinusoidal ripple in the DC current and carries the DC current and the DC power component, and
   an additional winding on a second core, wherein the first winding and the first core are separate from the additional winding and the second core, wherein the variable sinusoidal AC ripple in the DC current causes the power inductor to wirelessly transfer power to the additional winding, wherein the additional winding that carries a secondary AC current and a secondary AC power component that is transformed from the AC current and the AC power component of the first winding,
   a DC power output loop connected to a second side of the first winding for delivering DC power to a DC load, wherein the delivered DC power is a function of the DC current and the DC power component of the first winding of the power inductor, and
   an AC power output loop connected to the additional winding for delivering AC power to an AC load, wherein the delivered AC power is a function of the secondary AC current and the secondary AC power component of the additional winding, and
   a controller operably coupled to the power converter or inverter circuit, wherein the controller comprises a processor and a memory operably coupled to the processor, the memory having computer-executable instructions stored thereon that, when executed by the processor, cause the controller to independently regulate the delivered DC power and/or the delivered AC power by altering at least one of a signal that controls a duty cycle or a switching frequency of the switch, wherein the delivered AC power is regulated by varying an amount of the sinusoidal ripple in the DC current from a range of only the delivered DC power and none of the delivered AC power to only the delivered AC power and none of the delivered DC power, and all the values therebetween for the delivered DC power and the delivered AC power.

2. The device of claim 1, wherein the controller comprises a respective closed control loop for regulating each of the DC power and the AC power.

3. The device of claim 1, wherein the power converter or inverter circuit further comprises a pulse width modulation (PWM) generator operably coupled to the controller, the PWM generator being configured to transmit control signals to the switch of the power converter or inverter circuit.

4. The device of claim 1, wherein the power inductor comprises a variable inductor.

5. The device of claim 1, further comprising a plurality of power converter or inverter circuits, wherein respective DC power output loops or respective AC power output loops of the power converter or inverter circuits are connected in series or parallel.

6. The device of claim 1, wherein the power converter or inverter circuit further comprises a plurality of the power inductors and a plurality of AC power output loops, each AC power output loop being configured to deliver the AC power to a load, and wherein the delivered AC power is a function of the AC current and the AC power component of a respective power inductor.

7. The device of claim 1, wherein the device comprises an electric vehicle (EV) converter circuit.

8. The device of claim 1, wherein the device is used to provide polyphase AC power.

9. The device of claim 1, wherein at least one of the first winding or the additional winding comprises at least one of copper, gold, graphene, carbon nanotubes, a superconductor material, a piezoelectric material, or an RF element.

10. The device of claim 1, further comprising a magnetic sheet placed within a gap between the first winding and the additional winding.

11. The device of claim 10, further comprising a permanent magnet placed within the first core or the second core or the gap.

12. The device of claim 1, further comprising a power source.

13. A method for simultaneous transfer of alternating-current (AC) and direct-current (DC) power, comprising:
   providing a DC source, wherein the DC source provides a DC current having a DC power component;
   providing a switch connected to the DC source, wherein the switch induces a variable sinusoidal AC ripple in the DC current, wherein the switch is connected to a first side of a first winding on a first core of a power inductor and said first winding carries an AC current and an AC power component both caused by the variable sinusoidal ripple in the DC current and carries the DC current and the DC power component;
   regulating DC power delivered to a DC load via a DC power output loop connected to a second side of the first winding, wherein the DC power is a function of the DC component of the DC current of the first winding of the power inductor; and
   regulating AC power delivered to an AC load via an AC power output loop comprising an additional winding on a second core, wherein the first winding and the first core are separate from the additional winding and the second core, wherein the variable sinusoidal AC ripple in the DC current causes the power inductor to wirelessly transfer power to the additional winding wherein the additional winding carries a secondary AC current and a secondary AC power component that is transformed from the AC current and the AC power component of the first winding, said DC power and the AC power are regulated independently of one another, wherein said delivered DC power and said delivered AC power are regulated by a controller operably coupled to the power converter or inverter circuit, wherein the controller comprises a processor and a memory operably coupled to the processor, the memory having computer-executable instructions stored thereon that, when executed the processor, cause the controller to independently regulate the delivered DC power and/or the delivered AC power by altering at least one of a signal that controls a duty cycle or a switching frequency of the switch, wherein the delivered AC power is regulated by varying an amount of the sinusoidal ripple in the DC current from a range of only the delivered DC power and none of the delivered AC power to only the delivered AC power and none of the delivered DC power, and all the values therebetween for the delivered DC power and the delivered AC power.

14. The method of claim 13, further comprising regulating the AC power delivered to the AC load via a plurality of AC power output loops of respective power converter or inverter circuits, wherein the respective perturbations of signals that control the respective duty cycles of the switches of the power converter or inverter circuits are phase shifted relative to each other.

15. The method of claim 13, further comprising adjusting an inductance value of the power inductor, and wherein the adjustment causes a change in the AC current and the AC power component of the first winding of the power inductor.

16. The method of claim 13, wherein the power converter or inverter circuit comprises a plurality of power inductors and a plurality of AC power output loops, each AC power output loop being configured to deliver the AC power to a respective AC load, and wherein the delivered AC power is a function of the AC current and the AC power component of a respective power inductor.

17. A system for simultaneous transfer of alternating current (AC) and direct current (DC) power, comprising:
 a DC load;
 an AC load; and
 a power transfer device that simultaneously provides power to is inductively coupled with the AC load and the DC load, the power transfer device comprising:
  a power converter or inverter circuit including:
  a DC source, wherein the DC source provides a DC current having a DC power component,
  a switch connected to the DC source, wherein the switch induces a variable sinusoidal AC ripple in the DC current, a power inductor having a first winding on a first core, wherein a first side of the first winding is connected to the switch, and said first winding carries an AC current and an AC power component both caused by the variable sinusoidal ripple in the DC current and carries the DC current and the DC power component, and
  an additional winding on a second core, wherein the first winding and the first core are separate from the additional winding and the second core and the first winding, wherein the variable sinusoidal AC ripple in the DC current causes the power inductor to wirelessly transfer power to the additional winding, wherein the additional winding that carries a secondary AC current and a secondary AC power component that is transformed from the AC current and the AC power component of the first winding,
  a DC power output loop connected to a second side of the first winding for delivering DC power to the DC load, wherein the delivered DC power is a function of the DC current and the DC power component of the first winding of the power inductor, and
  an AC power output loop connected to the additional winding for delivering AC power to the AC load, wherein the delivered AC power is a function of the secondary AC current and the secondary AC power component of the additional winding of the power inductor; and
  a controller operably coupled to the power converter or inverter circuit, wherein the controller comprises a processor and a memory operably coupled to the processor, the memory having computer-executable instructions stored thereon that, when executed the processor, cause the controller to independently regulate the delivered DC power and/or the delivered AC power by altering at least one of a signal that controls a duty cycle or a switching frequency of the switch, wherein the delivered AC power is regulated by varying an amount of the sinusoidal ripple in the DC current from a range of only the delivered DC power and none of the delivered AC power to only the delivered AC power and none of the delivered DC power, and all the values therebetween for the delivered DC power and the delivered AC power.

* * * * *